US011186739B2

(12) United States Patent
Ohta

(10) Patent No.: US 11,186,739 B2
(45) Date of Patent: Nov. 30, 2021

(54) PRINTING METHOD AND WHITE INK COMPOSITION

(71) Applicant: Seiko Epson Corporation, Tokyo (JP)

(72) Inventor: Hitoshi Ohta, Shiojiri (JP)

(73) Assignee: Seiko Epson Corporation

( * ) Notice: Subject to any disclaimer, the term of this patent is extended or adjusted under 35 U.S.C. 154(b) by 137 days.

(21) Appl. No.: 16/286,750

(22) Filed: Feb. 27, 2019

(65) Prior Publication Data
US 2019/0264057 A1 Aug. 29, 2019

(30) Foreign Application Priority Data
Feb. 28, 2018 (JP) .............................. JP2018-034470

(51) Int. Cl.
| | | |
|---|---|---|
| C09D 11/54 | (2014.01) |
| B41M 5/00 | (2006.01) |
| B41M 5/50 | (2006.01) |
| B41M 7/00 | (2006.01) |
| C09D 11/023 | (2014.01) |
| C09D 11/037 | (2014.01) |
| C09D 11/107 | (2014.01) |
| C09D 11/322 | (2014.01) |
| C09D 11/40 | (2014.01) |
| C09D 11/38 | (2014.01) |

(52) U.S. Cl.
CPC .......... C09D 11/54 (2013.01); B41M 5/0017 (2013.01); B41M 5/0023 (2013.01); B41M 5/0047 (2013.01); B41M 5/0064 (2013.01); B41M 5/50 (2013.01); B41M 7/009 (2013.01); C09D 11/023 (2013.01); C09D 11/037 (2013.01); C09D 11/107 (2013.01); C09D 11/322 (2013.01); C09D 11/38 (2013.01); C09D 11/40 (2013.01); B41M 5/0011 (2013.01)

(58) Field of Classification Search
CPC .......... B41M 5/0011; B41M 5/0017; B41M 5/0023; B41M 5/0047; B41M 5/0064; B41M 5/50; B41M 7/009; C09D 11/023; C09D 11/037; C09D 11/107; C09D 11/322; C09D 11/38; C09D 11/40; C09D 11/54
See application file for complete search history.

(56) References Cited

U.S. PATENT DOCUMENTS

| | | |
|---|---|---|
| 9,499,710 B2 | 11/2016 | Okuda et al. |
| 2015/0054883 A1 | 2/2015 | Okuda et al. |
| 2015/0111989 A1* | 4/2015 | Kagata .................. C09D 11/322 523/218 |
| 2015/0197654 A1 | 7/2015 | Okuda et al. |
| 2017/0232763 A1 | 8/2017 | Okuda |
| 2018/0127608 A1* | 5/2018 | Honma .................. C09D 11/107 |

FOREIGN PATENT DOCUMENTS

| | | |
|---|---|---|
| CN | 104774504 A | 7/2015 |
| EP | 2781564 A1 | 9/2014 |
| JP | 2015-071738 A | 4/2015 |
| WO | WO-2016-175743 A1 | 11/2016 |

OTHER PUBLICATIONS

Extended European Search Report for Patent Application No. EP 19159364.9, dated Aug. 8, 2019 (11 pages).

\* cited by examiner

*Primary Examiner* — James M Mellott
(74) *Attorney, Agent, or Firm* — Harness, Dickey & Pierce, P.L.C.

(57) ABSTRACT

A printing method is provided. The printing method includes applying a treatment liquid containing a flocculant operable to flocculate at least one constituent of an ink composition onto a printing medium, and applying at least one ink composition including a white ink composition containing a white coloring material and resin particles onto the printing medium. The volume average particle size of the resin particles varies 50% or less when the white ink composition is mixed with the treatment liquid.

10 Claims, No Drawings

PRINTING METHOD AND WHITE INK COMPOSITION

BACKGROUND

1. Technical Field

The present invention relates to a printing method and a white ink composition.

2. Related Art

An ink jet printing method is a technique for printing performed by applying an ink composition onto a printing medium by ejecting droplets of the ink through very thin nozzles. This method enables high-speed printing of a high-definition, high-quality image pattern with a relatively inexpensive apparatus.

It has recently been studied to directly print product labels on flexible packaging films such as PET films by an ink jet printing method. Flexible packaging films can be used to package food or the like therein. For packaging use, the printing surface of the flexible packaging film is made of a plastic, such as polyolefin, nylon, or polyester, and many of the flexible packaging films are transparent or translucent so that the contents of the package can be checked.

In addition, the ink jet printing method is being increasingly used in the sign and graphics market for, for example, advertising signs, window graphics, and car wrapping. The printing medium used for printing signs and graphics is selected from a variety of materials, such as banners, coated paper, matte paper, wall paper, cloth, and PET or PVC films and other plastic films. In particular, use of a type of advertising sign directly printed on a transparent or translucent film that will be pasted on a window is rapidly expanding.

For example, in JP-A-2015-071738, images are formed with one or more color ink compositions on a white ink layer intended to hide the background, called an undercoat layer. In the method disclosed in JP-A-2015-071738, a treatment liquid containing a flocculant is used to flocculate the coloring material, thereby reducing bleeding caused by applying ink droplets one after another onto the same region.

Unfortunately, when a coating layer of the white ink composition is formed, the coating layer is not sufficiently filled with the white ink composition (the degree of filling of the white ink composition is reduced) in some cases because one or more constituents of the white ink composition are flocculated by the flocculant.

SUMMARY

An advantage of some aspects of the invention is to sufficiently fill the coating layer of the white ink composition.

Application 1

According to an aspect of the invention, there is provided a printing method including applying a treatment liquid containing a flocculant operable to flocculate at least one constituent of an ink composition onto a printing medium, and applying at least one ink composition including a white ink composition containing a white coloring material and resin particles onto the printing medium. The volume average particle size of the resin particles in the white ink composition varies 50% or less when the white ink composition is mixed with the treatment liquid.

Application 2

The applying of the at least one ink composition may further include applying a non-white ink composition containing a non-white coloring material and resin particles onto the printing medium.

Application 3

The non-white ink composition may be applied onto a region of the printing medium in which the treatment liquid and the white ink composition have been applied.

Application 4

The volume average particle size of the resin particles in the non-white ink composition may vary more than 50% when the non-white ink composition is mixed with the treatment liquid.

Application 5

The volume average particle size of the non-white coloring material in the non-white ink composition may vary more than 50% when the non-white ink composition is mixed with the treatment liquid.

Application 6

The white ink composition may have a content of polyol having a normal boiling point of more than 280° C. that is 3.0% by mass or less relative to the total mass of the white ink composition.

Application 7

The white ink composition may contain a solvent containing nitrogen.

Application 8

The white ink composition may be applied onto the printing medium by being ejected from an ink jet head.

Application 9

The flocculant in the treatment liquid contains at least one selected from the group consisting of cationic resins, organic acids, and polyvalent metal salts.

Application 10

The volume average particle size of the white coloring material in the white ink composition may vary 50% or less when the white ink composition is mixed with the treatment liquid.

Application 11

The white ink composition may be applied onto the printing medium heated.

Application 12

The printing method may further include heating the printing medium after the applying of the treatment liquid and the applying of the at least one ink composition.

Application 13

The printing medium may be a less absorbent printing medium or a non-absorbent printing medium.

Application 14

According to another aspect of the invention, there is provided a white ink composition used for application onto printing media, in combination with a non-white ink composition containing a non-white coloring material and resin particles and a treatment liquid containing a flocculant operable to flocculate at least one constituent of an ink composition. The white ink composition contains a white coloring material and resin particles. The volume average particle size of the resin particles in the white ink composition varies 50% or less when the white ink composition is mixed with the treatment liquid.

DESCRIPTION OF EXEMPLARY EMBODIMENTS

Some embodiments of the invention will now be described. The following embodiments will be described by way of example. The invention is not limited to the following embodiments, and various modifications may be made within the scope and spirit of the invention. All the components disclosed in the following embodiments are not necessarily required for the invention.

1. Printing Method

The printing method disclosed herein includes applying a treatment liquid containing a flocculant operable to flocculate at least one constituent of an ink composition onto a printing medium, and applying at least one ink composition including a white ink composition containing a white coloring material and resin particles onto the printing medium.

1. 1. Printing Medium

The printing medium on which images are formed by the printing method according to an embodiment of the invention may have or may not have a printing surface absorbent of liquid, such as ink and the treatment liquid. Examples of the printing medium include, but are not limited to, liquid-absorbent printing media made of paper, plastic film, or cloth, less liquid-absorbent printing media such as book-printing paper, and non-liquid-absorbent printing media made of metal, glass, polymer, or the like. However, the printing method disclosed herein produces a significant effect when images are printed on a less liquid-absorbent or non-liquid-absorbent printing medium.

A less liquid-absorbent or non-liquid-absorbent printing medium mentioned herein refers to a printing medium that hardly absorb or does not absorb the ink composition or treatment liquid at all. Quantitatively, the non-liquid-absorbent or less liquid-absorbent printing medium exhibits a water absorption of 10 mL/m$^2$ or less for a period of 30 ms$^{1/2}$ from the beginning of contact with water, measured by Bristow's method. Bristow's method is broadly used for measuring liquid absorption in a short time, and Japan Technical Association of the Pulp and Paper Industry (JAPAN TAPPI) officially adopts this method. Details of this method are specified in Standard No. 51 of "JAPAN TAPPI Kami Pulp Shiken Houhou 2000-nen Ban" (JAPAN TAPPI Pulp and Paper Test Methods, edited in 2000). In contrast, liquid-absorbent printing media are those not belonging to the category of non-liquid-absorbent or less liquid-absorbent printing media. In the description disclosed herein, a less liquid-absorbent or non-liquid-absorbent printing medium may be simply referred to as a less absorbent or non-absorbent printing medium.

The non-liquid-absorbent printing medium may be a medium including a paper sheet or any other substrate coated with a plastic film or onto which a plastic film is bonded, or a plastic film not provided with an absorbent layer (liquid-receiving layer). The term plastic mentioned here may be polyvinyl chloride, polyethylene terephthalate, polycarbonate, polystyrene, polyurethane, polyethylene, or polypropylene.

The less liquid-absorbent printing medium may be provided with a coating layer (liquid-receiving layer) operable to receive inks and the treatment liquid on the surface thereof. The less liquid-absorbent printing medium whose substrate is paper may be a book-printing paper, such as art paper, coated paper, or matte paper, and the less liquid-absorbent printing medium whose substrate is plastic may be a film of polyvinyl chloride, polyethylene terephthalate, polycarbonate, polystyrene, polyurethane, polyethylene, polypropylene, or the like coated with a hydrophilic polymer or a coating formed by applying silica or titanium particles together with a binder.

The printing method disclosed herein may be used for flexible packaging films. Flexible packaging films are a type of non-liquid-absorbent printing medium described above. More specifically, a flexible packaging film is a thin flexible material of 5 μm to 70 μm in thickness (preferably 10 μm to 50 μm) used for wrapping or packaging food, toiletries, cosmetics, and the like, at the surface of which an antifogging or antistatic material or an antioxidant is present. Such a film does not easily allow the treatment liquid and the ink composition applied thereon to be fixed thereto compared to plastic films having an ordinary thickness. Even if the treatment liquid and the ink composition are fixed, the coatings of the treatment liquid and the ink composition are not so flexible as the film and are likely to peel from the film. The printing method disclosed herein is suitable for flexible packaging films.

The printing surface of the flexible packaging film may be made of a material containing at least one resin selected from the group consisting of olefin resin including polyethylene and polypropylene, ester resin including polyester, vinyl chloride resin including polyvinyl chloride, and amide resin including polyamide. The substrate, having the printing surface, of the flexible packaging film may be prepared by forming such a resin into a film or a sheet. In this instance, the resin film or sheet may be an unstretched film or a uniaxially or biaxially stretched film. In some embodiments, biaxially stretched films may be used. A laminated film formed by laminating some resin films or sheets may be used.

The printing method disclosed herein is also suitable for printing on printing media for signs and graphics. A variety of materials, such as banners, coated paper, matte paper, wall paper, cloth, and PET or PVC films and other plastic films, are used as printing media for signs and graphics. The printing method disclosed herein is particularly suitable for transparent or translucent plastic films used for window display, car wrapping, or the like. The substrate of such a film is flexible and may be polyolefin, PET, PVC, or the like. Many of such sign/graphic films have an adhesive layer at the surface opposite the printing surface and will be pasted on, for example, a window or a car body after printing. The sign/graphic film does not easily allow the treatment liquid and the ink composition applied thereon to be fixed thereto. Even if the treatment liquid and the ink composition are fixed, the coatings of the treatment liquid and the ink composition are not so flexible as the film and are likely to peel from the film. The printing method disclosed herein is also suitable for sign/graphic films.

The printing surface of the sign/graphic film may be made of a material containing at least one resin selected from the group consisting of olefin resin including polyethylene and polypropylene, ester resin including polyester, vinyl chloride resin including polyvinyl chloride, and amide resin including polyamide.

The printing medium may be transparent and colorless, translucent, colored and transparent, colored and opaque, or colorless and opaque. The printing medium itself may be colored or may be transparent or translucent. In this instance, a white ink composition may be used for the background of the printed image as a concealing layer to hide the color of the printing medium. For example, for printing a color image, an ink composition for the background of the color image may be applied onto the region where the color image will be printed, thus enhancing the color development of the color image.

1. 2. Application of Treatment Liquid

The printing method disclosed herein includes applying a treatment liquid onto a printing medium. The treatment liquid and how the treatment liquid is applied will be described below.

1. 2. 1. Treatment Liquid

The treatment liquid used in the printing method disclosed herein contains a flocculant.

1. 2. 1. 1. Flocculant

The treatment liquid contains a flocculant operable to flocculate one or more constituents of an ink composition. The flocculant reacts with the coloring material or the resin particles contained in the ink composition to function to flocculate the coloring material or the resin particles. The degree of flocculation of the coloring material or the resin particles by the flocculant depends on and can be adjusted by the flocculant, the coloring material, and the resin particles. Also, the flocculant reacts with the coloring material or the resin particles contained in the ink composition to flocculate the coloring material or the resin particles, as described above. Such flocculation enhances the color development of the coloring material, the fixability of resin particles, and/or the viscosity of the ink composition.

The flocculant may be, but is not limited to, a metal salt, an inorganic acid, an organic acid, or a cationic compound. The cationic compound may be a cationic resin (cationic polymer) or a cationic surfactant. A beneficial metal salt may be a polyvalent metal salt, and a beneficial cationic compound may be a cationic resin. Accordingly, in an embodiment, the flocculant may be selected from among cationic resins, organic acids, and polyvalent metal salts from the viewpoint of forming high-quality images exhibiting a high rub fastness and gloss.

Although a beneficial metal salt may be a polyvalent metal salt, a metal salt other than polyvalent metal salts may be used. In an embodiment, the flocculant may be at least one selected from the group consisting of metal salts and organic acids because these compounds are highly reactive with one or more constituents contained in the ink composition. If a cationic compound is used, a cationic resin may be selected. Cationic resin tends to be soluble in the treatment liquid. The flocculant may be a combination of a plurality of compounds.

Polyvalent metal salts are composed of a divalent or higher-valent metal ion and an anion. Examples of the divalent metal ion include calcium ion, magnesium ion, copper ion, nickel ion, zinc ion, barium ion, aluminum ion, titanium ion, strontium ion, chromium ion, cobalt ion, and ferrous ion. In an embodiment, at least calcium ion or magnesium ion may be selected from among the polyvalent metal salts. Calcium and magnesium ions are beneficial for flocculating one or more constituents of the ink composition.

The counter anion of the polyvalent metal salt may be an inorganic anion or an organic anion. Hence, the polyvalent metal salt used in the treatment liquid is a salt composed of an inorganic or organic anion and a polyvalent metal ion. Examples of the inorganic anion include chloride ion, bromide ion, iodide ion, nitrate ion, sulfate ion, and hydroxide ion. Examples of the organic anion include organic acid ions, such as carboxylate ions.

The polyvalent metal compound may be a polyvalent ionic metal salt. In particular, magnesium salts and calcium salts can stabilize the treatment liquid. Also, the counter ion of the polyvalent metal ion may be an inorganic acid ion or an organic acid ion.

Examples of the polyvalent metal salt include calcium carbonate including heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. These polyvalent metal salts may be used individually or in combination. In an embodiment, at least one salt of magnesium sulfate, calcium nitrate, and calcium chloride may be used, and calcium nitrate may be more beneficial. These metal salts are sufficiently soluble in water, and use thereof tends to reduce traces of the treatment liquid. The raw material of the metal salt may contain hydrated water.

In an embodiment, a monovalent metal salt, such as sodium chloride or potassium chloride, may be used as an alternative to the polyvalent metal salt. Sodium sulfate or potassium sulfate may also be used.

Examples of the organic acid include poly(meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridinecarboxylic acid, coumaric acid, thiophenecarboxylic acid, nicotinic acid, and derivatives or salts of these acids. Organic acids may be used individually or in combination. Metal salts of the organic acid salts are considered to be members of the above-described group of metal salts.

Examples of the inorganic acid include sulfuric acid, hydrochloric acid, nitric acid, phosphoric acid, and salts thereof. Inorganic acids may be used individually or in combination.

Examples of the cationic resin (cationic polymer) include cationic urethane resin, cationic olefin resin, and cationic amine resin.

Any known cationic urethane resin may be used. A commercially available cationic urethane resin may be used, and examples thereof include HYDRAN series CP-7010, CP-7020, CP-7030, CP-7040, CP-7050, CP-7060, and CP-7610 (each produced by DIC); SUPERFLEX series 600, 610, 620, 630, 640, and 650 (each produced by Dai-ichi Kogyo Seiyaku); and Urethane Emulsions WBR-2120C and WBR-2122C (each produced by Taisei Fine Chemical).

Cationic olefin resin has a skeleton containing an olefin, such as ethylene or propylene. Any known olefin resin may be used as the flocculant. The cationic olefin resin may be dispersed in a solvent, such as water or an organic solvent, thus being in the form of an emulsion. A commercially available cationic olefin resin may be used, and examples thereof include Arrowbase series CB-1200 and CD-1200 (produced by Unitika).

The cationic amine resin (cationic amine polymer) is not particularly limited provided that it has an amino group in the molecule and may be selected from among known cationic amines. For example, the cationic amine resin may be polyamine resin, polyamide resin, or polyallylamine resin. Polyamine resin is a resin having an amino group in the main skeleton of the resin. Polyamide resin is a resin having an amide group in the main skeleton of the resin. Polyallylamine resin is a resin having a structure derived from the allyl group in the main skeleton of the resin.

Examples of the polyallylamine resin include polyallylamine hydrochloride, polyallylamine amidosulfate, allylamine hydrochloride-diallylamine hydrochloride copolymer, allylamine acetate-diallylamine acetate copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymer, diallylmethylethylammonium ethylsulfate-sulfur dioxide copolymer, methyldiallylamine hydrochloride-sulfur dioxide copolymer, diallyldimethylammonium chloride-sulfur dioxide copolymer, and diallyldimethylammonium chloride-acrylamide copolymer. Some cationic allylamine resins are commercially available, and examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (each produced by Nittobo Medical); and HymoNeo-600, Hymolock series Q-101, Q-311, and Q-501, and Himax series SC-505 and SC-505 (each produced by Hymo).

Examples of the cationic polyamine resin include UNISENCE KHE 103L (aqueous solution of hexamethylenediamine-epichlorohydrin resin with a solids content of 50% by mass, 1% aqueous solution thereof has a pH of about 5.0 and a viscosity of 20 mPa·s to 50 mPa·s) and UNISENCE KHE104L (aqueous solution of dimethylamine-epichlorohydrin resin with a solids content of 20% by mass, 1% aqueous solution thereof has a pH of about 7.0 and a viscosity of 1 mPa·s to 10 mPa·s), each produced by SENKA corporation.

Examples of the cationic surfactant include: primary, secondary, or tertiary amine salts including alkyl amine salts, dialkyl amine salts, and aliphatic amine salts; quaternary ammonium salts, such as benzalkonium salts and other quaternary alkyl ammonium salts, alkyl pyridinium salts, sulfonium salts, phosphonium salts, onium salts, and imidazolinium salts. More specifically, examples of such a cationic surfactant include hydrochlorides or acetates of laurylamine, palm amine, and rosin amine, lauryltrimethylammonium chloride, cetyltrimethylammonium chloride, benzyltributylammonium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride.

A plurality of flocculants may be used. Furthermore, by selecting at least one of a polyvalent metal salt, an organic acid, and a cationic resin from among the flocculants cited above, the treatment liquid can exhibit an appropriate flocculating function, thus forming high-quality imagery (peculiarly in terms of color development).

The flocculant content in the treatment liquid may be in the range of 0.1% by mass to 20% by mass and is preferably 0.5% by mass to 15% by mass, more preferably 2% by mass to 10% by mass, relative to the total mass of the treatment liquid. Even when a flocculant in the form of a solution or a dispersion is added into the treatment liquid, it is beneficial that the flocculant content in terms of solid content is in such a range. When the flocculant content is 0.1% by mass or more, the flocculant can sufficiently flocculate one or more constituents of the ink composition. In addition, when the flocculant content is 30% by mass or less, the flocculant is likely to dissolve or disperse sufficiently in the treatment liquid, increasing the storage stability of the treatment liquid.

The solubility of the flocculant in 100 g of water at 25° C. is preferably 1 g or more, more preferably 3 g to 80 g so that the flocculant can be soluble in the treatment liquid even if the treatment liquid contains a hydrophobic organic solvent.

1. 2. 1. 2. Other Constituents

The treatment liquid may contain the following constituents in addition to the flocculant.

Water-Soluble Organic Solvent

The treatment liquid used in the printing method according to an embodiment of the invention may contain a water-soluble organic solvent. The water-soluble organic solvent functions to increase the wettability of the treatment liquid on the printing medium and increase the moisture-retaining property of the treatment liquid. The water-soluble organic solvent may be an ester, an alkylene glycol ether, a cyclic ester, a nitrogen-containing solvent, or a polyhydric alcohol. The nitrogen-containing solvent may be a cyclic amide or a non-cyclic amide. The non-cyclic amide may be an alkoxyalkylamide.

Examples of the ester include glycol monoacetates, such as ethylene glycol monoethyl ether acetate, ethylene glycol monomethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

Examples of the alkylene glycol ether include alkylene glycol monoethers and alkylene glycol diethers and may be an alkyl ether. More specifically, examples of such an alkylene glycol ether include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

In some embodiments, alkylene glycol diethers may be more beneficial than alkylene glycol mono ethers. Alkylene glycol diethers are more likely to dissolve the resin particles or cause the resin particles to become distended, thus increasing the rub fastness of the resulting image.

Examples of the cyclic ester include lactones, such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nanolactone, ε-nanolactone, and ε-decanolactone; and compounds derived from these lactones by substituting an alkyl group having a carbon number of 1 to 4 for the hydrogen of the methylene group adjacent to the carbonyl group of the lactone.

Examples of the alkoxyalkylamide include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amide include lactams, such as 2-pyrrolidone, 1-methyl-2-pyrrolidone, 1-ethyl-2-pyrrolidone, 1-propyl-2-pyrrolidone, and 1-butyl-2-pyrrolidone. These cyclic amides are beneficial for increasing the solubility of the flocculant and facilitating the formation of the coating of the resin particles, and 2-pyrrolidone is more beneficial.

The alkoxyalkylamide may be a compound represented by the following general formula (1):

$$R^1-O-CH_2CH_2-(C=O)-NR^2R^3 \quad (1)$$

In formula (1), $R^1$ represents an alkyl group having a carbon number of 1 to 4, and $R^2$ and $R^3$ each independently represent a methyl group or an ethyl group. The alkyl group having a carbon number of 1 to 4 may be linear or branched, and examples thereof include methyl, ethyl, n-propyl, isopropyl, n-butyl, isobutyl, sec-butyl, and tert-butyl. Compounds represented by formula (1) may be used individually or in combination.

The compound represented by formula (1) functions, for example, to help the treatment liquid applied onto a less absorbent printing medium to dry rapidly and fix firmly to the printing medium. In particular, the compound represented by formula (1) can favorably soften or dissolve vinyl chloride resin. Accordingly, the compound represented by formula (1) can soften or dissolve the printing surface containing a vinyl chloride resin and allow the treatment liquid to permeate into the less absorbent printing medium. The permeated treatment liquid becomes likely to be firmly fixed to the printing medium and dried at the surface. Thus, the resulting image is likely to have well-dried surface and to be sufficiently fixed.

In some embodiments, $R^1$ in formula (1) may be the methyl group, which has a carbon number of 1. The normal boiling point of such a compound is lower than the normal boiling point of the compounds of formula (1) in which $R^1$ represents an alkyl group having a carbon number of 2 to 4. Accordingly, the use of a compound of formula (1) in which $R^1$ represents a methyl group helps the surface of the region where the treatment liquid is applied to dry more satisfactorily (particularly in the case of high-temperature and high-humidity printing).

The content of the compound of formula (1), if used, may be in, but is not limited to, the range of about 5% by mass to 50% by mass or 8% by mass to 48% by mass. When the content of the compound of formula (1) is in such a range, the resulting image can be sufficiently fixed and have a satisfactorily dried surface (particularly in the case of high-temperature, high-humidity printing).

Examples of the polyhydric alcohol include 1,2-alkanediols, such as ethylene glycol, propylene glycol (also known as propane-1,2-diol), 1,2-butanediol, 1,2-pentanediol, 1,2-hexanediol, 1,2-heptanediol, and 1,2-octanediol; and other polyhydric alcohols (polyols), such as diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin.

The polyhydric alcohol may be an alkanediol or a polyol. The alkanediol diol is a diol of an alkane having a carbon number of 5 or more. The carbon number of the alkane may be 5 to 15 and is preferably 6 to 10, more preferably 6 to 8. In some embodiments, 1,2-alkanediol may be selected.

The polyol is that of an alkane having a carbon number of 4 or less or in the form of a condensate produced by condensation between some hydroxy groups of the molecules of a polyol of an alkane having a carbon number of 4 or less. The carbon number of the alkane may be 2 or 3. The number of hydroxy groups in the polyol molecule is 2 or more and may be 5 or less or 3 or less. If the polyol is in the form of a condensate, the number of condensations between molecules is 2 or more and may be 4 or less or 3 or less. Polyhydric alcohols may be used individually or in combination.

Alkanediols and polyols function mainly as a penetrating solvent and/or a moisturizing agent. Alkanediols are rather penetrating solvents, and polyols are rather moisturizing agents.

The treatment liquid may contain only one water-soluble organic solvent or two or more water-soluble organic solvents in combination. The total water-soluble organic solvent content in the treatment liquid may be, for example, in the range of 5% by mass to 50% by mass relative to the total mass of the treatment liquid and is preferably in the range of 10% by mass to 45% by mass, more preferably 15% by mass to 40% by mass or 20% by mass to 40% by mass. When the water-soluble organic solvent content is in such a range, the treatment liquid exhibits a good balance between wettability and drying and helps form high-quality images. In addition, when the water-soluble organic solvent content is in such a range, the solubility of the flocculant in the treatment liquid is not reduced much.

Beneficially, the content of polyol solvent that is liquid at 25° C. and has a normal boiling point of more than 280° C. is 5% by mass or less relative to the total mass of the treatment liquid. In an embodiment, the content of such a polyol may be 3% by mass or less, 1% by mass or less, or 0.5% by mass or less. The lower limit of the content of such a polyol may be 0% by mass, and such a polyol may not be contained. Such a treatment liquid can be dried satisfactorily when applied onto the printing medium and exhibit a high adhesion to the printing medium. Beneficially, the content of organic solvents (not limited to polyol) that are liquid at 25° C. and have a normal boiling point of more than 280° C. is in any of the above-mentioned ranges from the viewpoint of drying the treatment liquid and increasing the adhesion of the treatment liquid to the printing medium. Exemplary organic solvents having a normal boiling point of more than 280° C. include glycerin and polyethylene glycol monomethyl ether.

The treatment liquid may contain a solvent containing nitrogen (hereinafter referred to as nitrogen-containing solvent) with a content of 1% by mass to 25% by mass in view of rub fastness. In an embodiment, the nitrogen-containing solvent content may be in the range of 5% by mass to 23% by mass, 7% by mass to 20% by mass, or 11% by mass to 17% by mass.

The treatment liquid may contain a polyhydric alcohol with a content of 1% by mass to 27% by mass in view of rub fastness. In an embodiment, the polyhydric alcohol content may be in the range of 5% by mass to 15% by mass or 7% by mass to 13% by mass.

Surfactant

The treatment liquid may contain a surfactant. The surfactant functions to reduce the surface tension to increase the wettability of the treatment liquid on the printing medium. In some embodiments, an acetylene glycol-based surfactant, a silicone surfactant, or a fluorosurfactant may be used.

Examples of the acetylene glycol-based surfactant include, but are not limited to, Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (each produced by Air Products and Chemicals Inc.); Olfine series B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (each produced by Nissin Chemical Industry); and Acetylenol series E00, E00P, E40, and E100 (each produced by Kawaken Fine Chemical).

The silicone surfactant used herein may be, but is not limited to, a polysiloxane-based compound. For example, a polyether-modified organosiloxane may be used as the polysiloxane-based compound. The polyether-modified organosiloxane is commercially available, and examples thereof include BYK-306, BYK-307, BYK-333, BYK-341, BYK-345, BYK-346, and BYK-348 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

The fluorosurfactant may be a fluorine-modified polymer, and examples thereof include BYK-3440 (produced by BYK), Surflon series S-241, S-242, and S-243 (each produced by AGC Seimi Chemical), and Ftergent 215M (produced by Neos).

If the treatment liquid contains a surfactant, a plurality of surfactants may be used. The content of the surfactant, if added, may be in the range of 0.1% by mass to 1.5% by mass, preferably 0.2% by mass to 1.0% by mass, more preferably 0.3% by mass to 0.8% by mass, relative to the total mass of the treatment liquid.

Water

The treatment liquid used in the printing method according to an embodiment of the invention may contain water. In some embodiments, the treatment liquid is aqueous. Herein, "aqueous" in relation to a composition denotes a composition containing water as one of the major solvents. Water may be one of the major solvents contained in the treatment liquid and is a constituent that will be evaporated by drying. Preferably, the water is pure water or ultra-pure water from which ionic impurities have been removed as much as possible. Examples of such water include ion exchanged water, ultrafiltered water, reverse osmosis water, and distilled water. Sterile water prepared by, for example, UV irradiation or addition of hydrogen peroxide may be used. Sterile water can reduce the occurrence of mold or bacteria and the use thereof is advantageous for storing ink for a long time. The water content in the treatment liquid may be 45% by mass or more and is preferably 50% by mass to 98% by mass, more preferably 55% by mass to 95% by mass, relative to the total mass of the treatment liquid.

Other Additives

The treatment liquid may contain a urea compound, an amine compound, a saccharide, and any other additives. Examples of the urea compound include urea, ethyleneurea, tetramethylurea, thiourea, 1,3-dimethyl-2-imidazolidinone, and betaines, such as trimethylglycine, triethylglycine, tripropylglycin, triisopropylglycine, N,N,N-trimethylalanine, N,N,N-triethylalanine, N,N,N-triisopropylalanine, N,N,N-trimethylmethylalanine, carnitine, and acetylcarnitine.

Examples of the amine compound include diethanolamine, triethanolamine, and triisopropanolamine. The urea compound and/or the amine compound may function as a pH adjuster.

Examples of the saccharide include glucose, mannose, fructose, ribose, xylose, arabinose, galactose, aldonic acid, glucitol (sorbitol), maltose, cellobiose, lactose, sucrose, trehalose, and maltotriose.

Resin Particles

The treatment liquid used in the printing method according to an embodiment of the invention may contain resin particles. The resin particles function as a fixing resin operable to increase the adhesion of the treatment liquid to the printing medium. Examples of the material of the resin particles include urethane resin, acrylic resin, styrene-acrylic resin, fluorene resin, polyolefin resin, rosin-modified resin, terpene resin, polyester resin, polyamide resin, epoxy resin, vinyl chloride resin, vinyl chloride-vinyl acetate copolymers, and ethylene vinyl acetate resin. The resin particles are often in the form of emulsion but may be used in the form of powder. The resin particles may be composed of a single material or a plurality of materials.

In some embodiments, resin particles unlikely to be subject to flocculation by the flocculant in the treatment liquid are selected as the resin particles added to the treatment liquid. Whether or not the resin particles are unlikely to be subject to flocculation by the flocculant in the treatment liquid may be checked by mixing a dispersion (emulsion) of the resin particles into the treatment liquid and measuring the change in volume average particle size of the resin particles from the volume average particle size before mixing, as will be described later herein. For adding resin particles to the treatment liquid, non-flocculable resin particles are selected from among the following. The definition of being flocculable or being non-flocculable will be given later herein.

Urethane resin is a generic term for resins having a urethane bond. The urethane resin used herein may have other bonds in addition to the urethane bond, and examples of such a urethane rein include a polyether-type urethane resin having an ether bond in the main chain, a polyester-type urethane resin having an ester bond in the main chain, and a polycarbonate-type urethane resin having a carbonate linkage in the main chain. Commercially available non-flocculable urethane resins may be used, and examples thereof include Superflex series 460, 460s, 840, E-4000 (each produced by Dai-ichi Kogyo Seiyaku), Resamine series D-1060, D-2020, D-4080, D-4200, D-6300, and D-6455 (each produced by Dainichiseika Color & Chemicals Mfg.), Takelac series WS-6021 and W-512-A-6 (each produced by Mitsui Chemicals), Sancure 2710 (produced by Lubrizol), and PERMARIN UA-150 (produced by Sanyo Chemical Industries).

Acrylic resin is a generic term for polymers of one or more acrylic monomers, such as (meth)acrylic acid and (meth)acrylic acid esters and may be, for example, a resin produced from one or more acrylic monomers or a copolymer of one or more acrylic monomers and other monomers. For example, an acrylic-vinyl resin, which is a copolymer of an acrylic monomer and a vinyl monomer, may be used. More specifically, a copolymer of acrylic monomer and a vinyl monomer, such as styrene, may be used.

The acrylic monomer may be acrylamide, acrylonitrile, or the like. A commercially available acrylic resin emulsion may be used as the acrylic resin, and a non-flocculable acrylic resin emulsion may be selected from among FK-854 (produced by CHIRIKA), Mowinyl 952B and Mowinyl 718A (each produced by Nippon Synthetic Chemical Industry), Nipol LX852 and Nipol LX874 (each produced by Nippon Zeon), and other commercially available products.

The acrylic resin used herein may be a styrene acrylic resin described later herein. (Meth)acrylic (or (meth)acrylate) used herein refers to at least one of acrylic (or acrylate) and methacrylic (or methacrylate).

Styrene acrylic resin is a type of copolymer produced from styrene monomers and acrylic monomers, and examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. Some styrene acrylic resins are commercially available, and a non-flocculable styrene acrylic resin may be selected from commercially available products including JONCRYL series 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (each produced by BASF), MOWINYL series 966A and 975N (each produced by Nippon Synthetic Chemical Industry), and VINYBLAN 2586 (produced by Nissin Chemical Industry).

Polyolefin resin is a type of resin having a skeleton containing an olefin, such as ethylene or propylene. In an embodiment a known olefin resin may be used. Some olefin resins are commercially available, and a non-flocculable olefin resin may be selected from commercially available products including ARROWBASE series CB-1200 and CD-1200 (produced by Unitika).

The resin particles may be in the form of an emulsion, and commercially available resin particle emulsions include Micro Gel E-1002 and Micro Gel E-5002 (each styrene acrylic resin emulsion produced by Nippon Paint); VONCOAT 4001 (acrylic resin emulsion produced by DIC) and VONCOAT 5454 (styrene acrylic resin emulsion produced by DIC); Polysol series AM-710, AM-920, AM-2300, AP-4735, AT-860, and PSASE-4210E (each acrylic resin emulsion), Polysol AP-7020 (styrene acrylic resin emulsion), Polysol SH-502 (vinyl acetate resin emulsion), Polysol series AD-13, AD-2, AD-10, AD-96, AD-17, and AD-70 (each ethylene-vinyl acetate resin emulsion), and Polysol PSASE-6010 (ethylene-vinyl acetate resin emulsion) (each Polysol produced by Showa Denko); Polysol SAE1014 (styrene acrylic resin emulsion produced by Zeon Corporation); Saivinol SK-200 (acrylic resin emulsion produced by Saiden Chemical Industry); AE-120A (acrylic resin emulsion produced by JSR); AE373D (carboxy-modified styrene acrylic resin emulsion produced by Emulsion Technology Co., Ltd.); SEIKADYNE 1900W (ethylene-vinyl acetate resin emulsion produced by Dainichiseika Color & Chemicals); VINYBLAN 2682 (acrylic resin emulsion), VINYBLAN 2886 (vinyl acetate-acrylic resin emulsion), and VINYBLAN 5202 (acetic acid-acrylic resin emulsion) (each VINYBLAN produced by Nissin Chemical Industry); Elitel series KA-5071S, KT-8803, KT-9204, KT-8701, KT-8904, and KT-0507 (each polyester resin emulsion produced by Unitika); Hytec SN-2002 (polyester resin emulsion produced by Toho Chemical Industry); Takelac series W-6020, W-635, W-6061, W-605, W-635, and W-6021 (each urethane resin emulsion produced by Mitsui Chemicals); Superflex series 870, 800, 150, 420, 460, 470, 610, and 700 (each urethane resin emulsion produced by Dai-ichi Kogyo Seiyaku); PERMARIN UA-150 (urethane resin emulsion produced by Sanyo Chemical Industries); Sancure 2710 (urethane resin emulsion produced by Lubrizol); NeoRez series R-9660, R-9637, and R-940 (each urethane resin emulsion produced by Kusumoto Chemicals); ADEKA Bon-Tighter series HUX-380 and 290K (urethane resin emulsion produced by ADEKA); MOWINYL 966A and MOWINYL 7320 (each produced by Nippon Synthetic Chemical Industry); JONCRYL series 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (each produced by BASF); NK Binder R-5HN (produced by Shin-Nakamura Chemical); HYDRAN WLS-210 (non-crosslinked polyurethane produced by DIC); and JONCRYL 7610 (produced by BASF). In an embodiment, a non-flocculable emulsion may be selected from these commercially available products.

The resin particles may have a glass transition temperature (Tg) in the range of −50° C. to 200° C., preferably 0° C. to 150° C. or 50° C. to 100° C. The use of resin particles having such a glass transition temperature tends to increase durability and reduce clogging. The glass transition temperature may be measured with, for example, a differential scanning calorimeter DSC 7000 manufactured by Hitachi High-Tech Science in accordance with JIS K7121 (Testing Method for Transition Temperatures of Plastics).

The volume average particle size of the resin particles (before mixing with the treatment liquid) is preferably in the range of 10 nm to 300 nm, more preferably in the range of 50 nm to 250 nm, still more preferably 100 nm to 230 nm or 150 nm to 210 nm. The volume average particle size of the resin particles is measured as that in the initial state by a method as will be described later herein. Resin particles having such a volume average particle size are easily available and whose properties can be easily adjusted as desired.

The solids content of non-flocculable resin particles in the treatment liquid, if added, may be in the range of 0.1% by mass to 20% by mass and is preferably in the range of 1% by mass to 15% by mass or 2% by mass to 10% by mass.

Other Constituents

The treatment liquid used in the printing method according to an embodiment of the invention may further contain a preservative/fungicide agent, a rust preventive, a chelating agent, a viscosity modifier, an antioxidant, or a fungicide, if necessary.

1. 2. 2. Physical Properties of Treatment Liquid and Application of Treatment Liquid onto Printing Medium The surface tension at 25° C. of the treatment liquid used in an embodiment of the invention may be 40 mN/m or less from the viewpoint of appropriately spreading to wet the printing medium. In some embodiments, it may be 38 mN/m or less, for example, 35 mN/m or less or 30 mN/m or less. The surface tension can be determined by measuring the composition wetting a platinum plate at 25° C. with an automatic surface tensiometer CBVP-Z (manufactured by Kyowa Interface Science).

For application onto the printing medium, very small droplets of the treatment liquid may be ejected by an ink jet method, or the treatment liquid may be sprayed onto the printing medium. The printing medium may be soaked with the treatment liquid or may be painted with a brush or the like. Thus, the treatment liquid may be applied onto the printing medium in a contacting manner or a non-contacting manner or in a combined manner.

When the treatment liquid is applied onto the printing medium by a method other than an ink jet method, the viscosity of the treatment liquid at 20° C. may be as high as, for example, 1.5 mPa·s to 100 mPa·s, 1.5 mPa·s to 50 mPa·s, or 1.5 mPa·s to 20 mPa·s. The viscosity can be measured with a viscoelasticity meter, such as MCR-300 (manufactured by Pysica), by increasing the shear rate from 10 to 1000 at 20° C. and reading the indicated value of the meter at a shear rate of 200.

When the treatment liquid is applied onto the printing medium by an ink jet method, the viscosity of the treatment liquid at 20° C. may be 1.5 mPa·s to 15 mPa·s, 1.5 mPa·s to 5 mPa·s, or 1.5 mPa·s to 3.6 mPa·s.

1. 2. 3. Constituents to be Flocculated by Treatment Liquid and Degree of Flocculation While the flocculant contained in the treatment liquid has a flocculating function as described above, the white ink composition (described later herein) used in the printing method of the present disclosure contains resin particles unlikely to be subject to flocculation by the treatment liquid (such resin particles are hereinafter referred to as non-flocculable resin particles). Therefore, even though the treatment liquid and the white ink composition come into contact with each other on the printing medium, the non-flocculable resin particles are not likely to flocculate. Accordingly, printed images are not likely to have rough surfaces formed by flocculated resin particles, and the white coloring material can be uniformly distributed over the region to be printed. Thus, images with a reduced graininess (satisfactorily filled with the coloring material) can be formed.

Unlike the resin particles, the white coloring material in the white ink composition may be or may not be flocculated by the flocculant. If a white ink composition containing a flocculable white coloring material comes into contact with the treatment liquid, the white coloring material in the white ink composition is more likely to be subject to flocculation than the resin particles. Thus, when the treatment liquid and such a white ink composition come into contact with each other on the printing medium, the white coloring material flocculates and the color thereof is satisfactorily developed. In addition, the resin particles form a coating that can reduce the surface roughness of the image.

In contrast, if a white ink composition containing a white coloring material unlikely to be subject to flocculation comes into contact with the treatment liquid in the printing method of an embodiment, the white coloring material and the resin particles in the white ink composition do not flocculate much. Thus, when the treatment liquid and such a white ink composition come into contact with each other on the printing medium, the coating of the white ink composition has an even surface although the color development of the white coloring material is slightly reduced, and the coating may increase the durability of the image formed, for example, by applying a non-white ink composition onto the coating.

An embodiment in which the printing method includes applying a non-white ink composition (described later herein) onto the printing medium will now be described.

When the non-white ink composition optionally used in the printing method of the present embodiment contains a non-white coloring material and resin particles, it can be selected as desired how much the non-white coloring material and the resin particles are flocculable. In this instance, it is beneficial that both the non-white coloring material and the resin particles or either of them is likely to be subject to flocculation by the flocculant.

When the non-white ink composition containing flocculable resin particles comes into contact with the treatment liquid, the resin particles form a floc, and the non-white coloring material is taken into the floc and fixed to the surface of the white ink image. Thus, the rub fastness of the image formed with the non-white ink composition can be enhanced.

On the other hand, when the non-white ink composition containing flocculable non-white coloring material comes into contact with the treatment liquid, the non-white coloring material is flocculated to promote color development of the non-white coloring material. In addition, the non-white ink image on the white ink image is kept from bleeding, thus forming a clear or sharp image.

When the non-white ink composition containing a flocculable non-white coloring material and flocculable resin particles comes into contact with the treatment liquid, the non-white coloring material is flocculated to promote color development of the non-white coloring material while the non-white ink image on the white ink image is kept from bleeding, thus forming a clear or sharp image.

The degree of flocculation of the resin particles and the coloring materials used herein is defined by the change in volume average particle size of the resin particles or the coloring material when the treatment liquid is mixed with a dispersion liquid of the resin particles or the coloring material.

The change in particle size of the resin particles is examined as described below. A dispersion liquid of the resin particles (resin emulsion) used for preparation of the ink composition of interest is prepared. If the solid resin content in the dispersion liquid exceeds 10% by mass, the solid resin content is adjusted to 10% by mass by adding water. If the solid resin content is 10% by mass or less, the dispersion liquid is used as it is. The dispersion liquid thus prepared is mixed with the treatment liquid at room temperature (25° C.) so that the ratio of the solid resin content in the resin particle dispersion liquid to the solid flocculant content in the treatment liquid can be 4:1. The mixture is stirred at room temperature (25° C.) for 1 minute. The stirring is performed so that the entire mixture can be moved in a manner as it flows. For example, the mixture may be stirred at an appropriate stirring speed by using a magnetic stirrer having a size that can form the liquid surface of the mixture into a shape like a bowl during stirring. After being stirred, the mixture is allowed to stand for 1 minute. Subsequently, the mixture is diluted with water to a solid resin content of 0.01% by mass, and then the volume average particle size in the resulting mixture is measured. If the flocculant in the treatment liquid is a hydrate, the water in the form of hydrate is not taken into account for calculation of the solid content of the flocculant.

The volume average particle size in the resin particle dispersion liquid whose solid resin content has been adjusted to 0.01% by mass by adding water is measured as the particle size in the initial state.

Measurement is performed by a light scattering method, and D50 on a volume basis is used as the volume average particle size. The increase in volume average particle size from that in the initial state after the dispersion liquid has been mixed with the treatment liquid is defined as the change in volume average particle size. The change in volume average particle size may be represented by a variation defined by the following equation:

(D50 after mixing)−(D50 in initial state)/(D50 in initial state)×100=variation (%)

For determining the change in volume average particle size of a coloring material, a dispersion liquid of the coloring material used for preparing the ink composition is prepared. If the solid content of the coloring material exceeds 10% by mass, the solid coloring material content is adjusted to 10% by mass by adding water. The dispersion liquid thus prepared is mixed with the treatment liquid so that the ratio of the solid coloring material content in the coloring material dispersion liquid to the solid flocculant content in the treatment liquid can be 4:1. Other operations are performed in the same manner as in the case of determining the change in volume average particle size of resin particles, and thus the change in volume average particle size of the coloring material is examined. If a resin, such as a resin dispersant, is attached to the coloring material, the solid content of the coloring material takes the resin attached to the coloring material into account.

When the resulting variation is 50% or less, the resin particles or the coloring material is determined to be non-flocculable; when the variation exceeds 50%, the resin particles or the coloring material is determined to be flocculable. Also, when the variation is in the range of more than 3% to 10%, the material is determined to be very non-flocculable; and when the change value is 3% or less, the materials is determined to be significantly non-flocculable. The variation may become close to 0% and may be negative due to measurement error, the material is determined to be significantly non-flocculable as in the case of 3% or less. In the description in the present disclosure, the term "non-flocculable" may be used when the variation is 50% or less, and the term "flocculable" may be used when the variation exceed 50%.

The degree of flocculation of resin particles can be controlled, for example, by varying monomers used for resin synthesis and proportions of the monomers, or by, if resin particles are dispersed by emulsifying dispersion, varying the type of emulsifier and the amount thereof. For example, the degree of flocculation may be reduced by using resin particles having a low acid value synthesized by using a large amount of a monomer having a low acid value, or increasing the amount of emulsifier. The monomer having a low acid value may be a monomer having no anionic group, such as the carboxy group or the sulfo group. Thus, the degree of flocculation of the resin particle thus prepared is determined as described above, and resin particles flocculable or non-flocculable to a desired degree may be selected for use.

If less flocculable resin particles are used, the variation in volume average particle size of the resin particles is 50% or less and may be reduced to 10% or less or 3% or less so that the ink composition can sufficiently fill the region to be printed. The lower limit of the variation may be, but is not limited to, 0% or more. If flocculable resin particles are used, the variation in volume average particle size of the resin particles may be controlled to more than 3%, more than 10%, or more than 50% so that bleeding can be reduced.

The flocculation of the coloring material can be controlled by adjusting the amount of the anionic group of the coloring material, or, if the particles of the coloring material are partially coated with a resin for dispersion, by adjusting the monomers used for the synthesis of the resin and the proportions of the monomers. For example, a flocculable coloring material can be obtained by increasing the proportion of the anionic group of the coloring material or by increasing the acid value of the resin. In contrast, by reducing the proportion of the anionic group of the coloring material of by reducing the acid value of the resin, a less flocculable coloring material can be obtained. Thus, the degree of flocculation of the coloring material thus prepared is determined as described above, and a coloring material flocculable or non-flocculable to a desired degree may be selected for use.

If a less flocculable coloring material is used, the variation in volume average particle size of the coloring material is 50% or less and may be reduced to 10% or less or 3% or less so that the ink composition can sufficiently fill the region to be printed. The lower limit of the variation may be, but is not limited to, 0% or more. If a flocculable coloring material is used, the variation in volume average particle size of the coloring material may be controlled to more than 3%, more than 10%, or more than 50% so that bleeding can be reduced.

1. 3. Application of Ink Composition

The printing method disclosed herein includes applying an ink composition onto a printing medium. The ink composition applied onto the printing medium may be only one ink composition or a plurality of ink compositions, and the number of times of application may be plural according to the number of ink compositions. The printing method disclosed herein includes at least applying a white ink composition onto a printing medium. In the following description, the white ink composition and application thereof will first be described, followed by other ink compositions.

1. 3. 1. White Ink Composition

The white ink composition used in the printing method disclosed herein contains a white coloring material and resin particles. The white ink composition may further contain other constituents, and such constituents may be selected from the constituents cited for the treatment liquid other than the flocculant, and the contents thereof may be independently set as described for the treatment liquid. The white ink composition is applied onto the printing medium in combination with the treatment liquid.

1. 3. 1. 1. White Coloring Material

The white coloring material used in the white ink composition may be a metal compound, such as a metal oxide, barium sulfate, or calcium carbonate. Examples of the metal oxide include titanium dioxide, zinc oxide, silica, alumina, and magnesium oxide. The white coloring material may include hollow particles, and known hollow particles may be used.

In some embodiments, titanium oxide may be used as the white coloring material from the viewpoint of increasing whiteness and rub fastness.

The white coloring material (solid) content in the white ink composition may be in the range of 0.5% by mass to 20% by mass relative to the total mass of the white ink composition and may be preferably in the range of 1% by mass to 20% by mass, more preferably 5% by mass to 15% by mass or 7% by mass to 15% by mass. When the white coloring material content is in such a range, the white ink composition is not likely to clog the nozzles of the ink jet printing apparatus and can provide a satisfactory whiteness or color density.

The average particle size (D50) of the white coloring material on a volume basis (hereinafter referred to as volume average particle size) may be in the range of 30 nm to 600 nm or 200 nm to 400 nm. When the volume average particle size of the white coloring material is in such a range, the particles of the white coloring material are not likely to settle and, accordingly, the dispersion thereof can be stable. In addition, such a white coloring material, when used in an ink jet printing apparatus, is not likely to clog the nozzles of the ink jet printing apparatus. Furthermore, the white coloring material having a volume average particle size in such a range can provides a satisfactory whiteness or color density.

The average particle size of the white coloring material can be measured with a particle size distribution analyzer based on a laser diffraction/scattering method. For example, a particle size distribution analyzer using dynamic light scattering (for example, Microtrac UPA manufactured by Nikkiso) may be used.

The "white" of the white ink composition and white coloring material used herein does not mean strictly white and may be colored to a chromatic or an achromatic color or may be glossy, provided that the color is visually recognized as white. In a quantitative sense, "white" is not necessarily a color having a lightness $L^*$ of 0 in the CIELAB color system and may be a color having a lightness $L^*$ in the range of 80 to 100 and saturation/chroma $a^*$ and $b^*$ in the range of −10 to +10 each.

Although the white coloring material may be flocculable or less flocculable in the presence of the treatment liquid, as described above, a less flocculable white coloring material may be beneficial from the viewpoint of appropriately filling the region to be printed.

The white coloring material may be able to be dispersed stably in water. For a stable dispersion of the white coloring material, a dispersant may be used. The dispersant may be a surfactant, a resin dispersant, or the like and may be selected from among dispersants that can ensure a stable dispersion of the white coloring material in the white ink composition.

The white coloring material may be or may not be likely to be subject to flocculation by the flocculant in the treatment liquid. Whether or not the white coloring material is flocculable depends on the flocculant. Therefore, the white coloring material is selected according to the desired degree of flocculation.

When a less flocculable white coloring material is used, the white ink composition can form images having a reduced granularity and sufficiently filled the white ink composition.

1. 3. 1. 2. Resin Particles

The white ink composition used in the printing method disclosed herein contains resin particles. The resin particles are unlikely to be subject to flocculation by the treatment liquid (non-flocculable resin particles). Less flocculable resin particles are beneficial from the viewpoint of appropriately filling the region to be printed.

The resin particles in the white ink composition function as a fixing resin operable to increase the adhesion of the coating or image formed with the white ink composition to the printing medium. In addition, the resin particles in the white ink composition, which are unlikely to be subject to flocculation by the treatment liquid, can be evenly distributed in the region where the resin particles are applied. Thus, the white ink composition can form images having a reduced surface roughness. Consequently, the resulting white images of the white ink composition have a reduced granularity and are appropriately filled with the white ink composition.

Such resin particles are selected from the non-flocculable resin particles of the resin particles cited in "Resin Particles" for the treatment liquid, and thus description thereof is omitted.

The non-flocculable resin particles contained in the white ink composition may be acrylic resin. Acrylic resin is beneficial from the viewpoint of easily designing particles having desired properties (in terms of flocculation by the treatment liquid, temperature for forming a coating of the particles, particle size, and the like). In some embodiments, styrene acrylic resin may be used.

The resin particle content in terms of solid content in the white ink composition may be in the range of 0.1% by mass to 20% by mass relative to the total mass of the white ink composition and is preferably in the range of 1% by mass to 15% by mass, more preferably 3% by mass to 10% by mass.

1. 3. 1. 3. Other Constituents

The white ink composition may further contain a water-soluble organic solvent, a surfactant, water, a wax, a resin dispersant, a preservative/fungicide agent, a rust preventive, a chelating agent, a viscosity modifier, an antioxidant, a fungicide, and other additives in addition to the white coloring material and the resin particles.

The water-soluble organic solvent, the surfactant, the water and other additives that may be contained in the white ink composition are the same as those described for the treatment liquid, and thus description thereof is omitted. The white ink composition may be aqueous.

The content of polyol solvent that is liquid at 25° C. and have a normal boiling point of more than 280° C. in the white ink composition may be 3.0% by mass or less relative to the total mass of the white ink composition. In an embodiment, the content of such a polyol solvent may be 2.0% by mass or less, 1.0% by mass or less, or 0.5% by mass or less. The lower limit of the content of such a polyol solvent may be 0% by mass, and such a polyol may not be contained. Such a white ink composition can be dried appropriately when applied onto the printing medium and exhibit a high adhesion to the printing medium. The polyol that is liquid at 25° C. and has a normal boiling point of more than 280° C. may be glycerin. Furthermore, it is beneficial to control the content of organic solvents (not limited to polyol) that are liquid at 25° C. and have a normal boiling point of more than 280° C. in any of the ranges mentioned above because of the above-described reasons.

The white ink composition may contain a solvent containing nitrogen with a content of 1% by mass to 25% by mass in view of rub fastness. In an embodiment, the nitrogen-containing solvent content may be in the range of 3% by mass to 20% by mass or 5% by mass to 15% by mass.

The white ink composition may contain a polyhydric alcohol with a content of 1% by mass to 25% by mass in view of rub fastness. In an embodiment, the polyhydric alcohol content may be in the range of 3% by mass to 20% by mass or 5% by mass to 15% by mass.

The white ink composition may contain a wax. The wax is operable to make images printed with the white ink composition glossy and smooth and reduce separation of the images.

Examples of the wax include vegetable or animal waxes, such as carnauba wax, candelilla wax, beeswax, rice wax, and lanolin; petrolatum waxes, such as paraffin wax, microcrystalline wax, polyethylene wax, oxidized polyethylene wax, and petrolatum; mineral waxes, such as montan wax and ozokerite; synthetic waxes, such as carbon wax, Hoechst wax, polyolefin wax, and stearic acid amide; natural or synthetic wax emulsions, such as α-olefin-maleic anhydride copolymer; and blended waxes. These waxes may be used individually or in combination. In some embodiments, a polyolefin wax (particularly polyethylene wax or polypropylene wax) or a paraffin wax may be used. These waxes are good in terms of increasing the fixability of the ink composition to flexible packaging films.

A commercially available wax may be used as it is, and examples thereof include NOPCOTE PEM-17 (produced by San Nopco), CHEMIPEARL W4005 (produced by Mitsui Chemicals), and AQUACER series 515, 539, and 593 (each produced by BYK).

It is beneficial to use a wax having a melting point of 50° C. to 200° C., preferably 70° C. to 180° C. or 90° C. to 150° C., from the viewpoint of preventing the wax from being melted and degraded in performance by heating that may be performed in the printing method.

The wax may be in the form of emulsion or suspension. The wax content in the white ink composition is may be in the range of 0.1% by mass to 10% by mass and is preferably 0.5% by mass to 5% by mass, more preferably 0.5% by mass to 2% by mass, relative to the total mass of the white ink composition. When the wax content is in such a range, the wax can function appropriately as intended.

It is beneficial that the white coloring material in the white ink composition is kept dispersed in the dispersion, or white ink composition. For such dispersion, the white coloring material may be dispersed with a resin dispersant, such as a water-soluble resin and/or a water-dispersive resin, or any other dispersant. Hydrophilic functional groups may be chemically or physically introduced to the surfaces of the particles of the white coloring material so that the white coloring material can be dispersed and/or dissolved in water without using such a dispersant. In some embodiments, the white coloring material is dispersed with a resin dispersant and thus used as a resin-dispersed coloring material in view of stable dispersion of the white coloring material in the white ink composition, ejection stability of the ink composition ejected through head nozzles by an ink jet method, and durability of the resulting images in terms of adhesion, rub fastness, and the like.

Examples of the resin dispersant include polyvinyl alcohols, polyacrylic acid, acrylic acid-acrylonitrile copolymer, vinyl acetate-acrylic ester copolymer, acrylic acid-acrylic ester copolymer, styrene-acrylic acid copolymer, styrene-methacrylic acid copolymer, styrene-methacrylic acid-acrylic ester copolymer, styrene-α-methylstyrene-acrylic acid copolymer, styrene-α-methylstyrene-acrylic acid-acrylic ester copolymer, styrene-maleic acid copolymer, styrene-maleic anhydride copolymer, vinyl naphthalene-acrylic acid copolymer, vinyl naphthalene-maleic acid copolymer, vinyl acetate-maleic acid ester copolymer, vinyl acetate-crotonic acid copolymer, vinyl acetate-acrylic acid copolymer, and salts thereof. In some embodiments, a copolymer of a monomer having a hydrophobic functional group and a monomer having a hydrophilic functional group, or a polymer formed of a monomer having both a hydrophobic functional group and a hydrophilic functional group may be used. If a copolymer is used, the copolymer may be a random copolymer, a block copolymer, an alternating copolymer, or a graft copolymer.

Since the resin dispersant used in the white ink composition is involved in a large part of whether the white coloring material is flocculated by the flocculant in the treatment liquid, a resin dispersant having desired properties may be selected from among the resin dispersants cited above according to the desired degree of flocculation.

The resin dispersant content may be appropriately set according to the white coloring material and is preferably in the range of 5 parts by mass to 200 parts by mass, more preferably 20 parts by mass to 120 parts by mass, relative to 100 parts by mass of the coloring material in the white ink composition.

In some embodiments, the white ink composition may contain a nitrogen-containing solvent, as mentioned above. The nitrogen-containing solvent is the same as the nitrogen-containing solvent described in "Water-Soluble Organic Solvent" for the treatment liquid. The proportion of the nitrogen-containing solvent contained in the white ink composition increases as the coating of the white ink composition dries. Thus, the non-flocculable resin particles in the white ink composition become easy to soften and dissolve. Consequently, the coating of the white ink composition can be easily formed, thus increasing the durability of the resulting image.

1. 3. 1. 4. Physical Properties of White Ink Composition and Application of White Ink Composition onto Printing Medium The surface tension at 25° C. of the white ink composition used in an embodiment of the invention may be 40 mN/m or less from the viewpoint of appropriately spreading to wet the printing medium. In some embodiments, it may be 38 mN/m or less, for example, 35 mN/m or less or 30 mN/m or less. The surface tension can be determined by measuring the composition wetting a platinum plate at 25° C. with an automatic surface tensiometer CBVP-Z (manufactured by Kyowa Interface Science).

For application onto the printing medium, very small droplets of the white ink composition may be ejected by an ink jet method, or the white ink composition may be sprayed onto the printing medium. The printing medium may be soaked with the white ink composition or may be painted with a brush or the like. Thus, the white ink composition may be applied onto the printing medium in a contacting manner or a non-contacting manner or in a combined manner.

In some embodiments, the white ink composition may be applied onto the printing medium by an ink jet method. In this instance, the viscosity of the white ink composition at 20° C. is preferably in the range of 1.5 mPa·s to 15 mPa·s, more preferably 1.5 mPa·s to 5 mPa·s, or 1.5 mPa·s to 3.6 mPa·s. The ink jet method facilitates efficient formation of desired images with the white ink composition.

1. 3. 2. Non-White Ink Composition

In an embodiment of the printing method disclosed therein, a non-white ink composition may be applied onto the printing medium. In other words, the printing method of an embodiment may include applying a non-white ink composition onto the printing medium. The non-white ink composition used in the printing method disclosed herein contains a non-white coloring material and resin particles. The non-white ink composition may further contain other constituents, and such constituents may be selected from the constituents cited for the treatment liquid and the white ink composition other than the flocculant and the white coloring material, and the contents thereof may be set independently as described for the treatment liquid and the white ink composition. The non-white ink composition may be aqueous. Also, the non-white ink composition is applied onto the printing medium in combination with the treatment liquid and the white ink composition.

1. 3. 2. 1. Non-White Coloring Material

A non-white coloring material refers to a coloring material other than the white coloring material. The non-white coloring material may be a dye, a pigment, or the like. The non-white coloring material may be a coloring material for a chromatic color, such as cyan, yellow, and magenta, and an achromatic color other than white, such as black.

What dye or pigment is used is not particularly limited. In some embodiments, a pigment may be used rather than a dye. The pigment may be an organic pigment from the viewpoint of storage stability in terms of resistance to light, weather, gases, and the like.

Examples of the pigment include azo pigments such as insoluble azo pigments, condensed azo pigments, azo lake, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; dye chelates, dye lakes, nitro pigments, nitroso pigments, aniline black, daylight fluorescent pigments, and carbon black. These pigments may pigment may be used as the non-white coloring material.

Any glittering pigment may be selected provided that it produces glitter when applied onto a medium. Examples of the glittering pigment include, but are not limited to, particles (metal pigment) of elemental metals or alloys, such as aluminum, silver, gold, platinum, nickel, chromium, tin, zinc, indium, titanium, and copper; and pearl pigments exhibiting pearl luster. Exemplary pearl pigments include pigments exhibiting pearl luster or interference gloss, such as titanium dioxide-coated mica, fish scale foil, and bismuth trichloride. The glittering pigment may be surface treated to inhibit a reaction with water.

If a dye is used, it may be selected from various types of dye generally used for ink jet printing, such as direct dyes, acid dyes, food dyes, basic dyes, reactive dyes, disperse dyes, vat dyes, soluble vat dyes, and reactive disperse dyes.

The non-white coloring material content in the non-white ink composition may be 0.3% by mass to 20% by mass, preferably 0.5% by mass to 15% by mass, relative to the total mass of the non-white ink composition.

The non-white coloring material may be flocculable or less flocculable. From the viewpoint of reducing bleeding, a flocculable material may be used.

The volume average particle size of the non-white coloring material (before mixing with the treatment liquid) is preferably in the range of 10 nm to 200 nm, more preferably in the range of 30 nm to 170 nm, still more preferably 50 nm to 150 nm or 70 nm to 120 nm. The volume average particle size of the non-white coloring material is measured as that in the initial state by the method described above. The non-white coloring material having such a volume average particle size are easily available and whose properties can be easily adjusted as desired.

1. 3. 2. 2. Resin Particles

The non-white ink composition that may be used in the printing method disclosed herein contains resin particles. The resin particles contained in the non-white ink composition may be or may not be likely to be subject to flocculation by the treatment liquid.

The resin particles in the non-white ink composition function as a fixing resin operable to increase the adhesion of the coating or image formed with the non-white ink composition to the printing medium. If the resin particles in the non-white ink composition is likely to be subject to flocculation by the treatment liquid, the resin particles may be flocculated in the region where the treatment liquid is applied, and thus, images formed with the non-white ink composition may have a high rub fastness.

Such resin particles are selected from the resin particles cited in "Resin Particles" for the treatment liquid, and thus description thereof is omitted.

The resin particles contained in the non-white ink composition may be acrylic resin. Acrylic resin is beneficial from the viewpoint of easily designing particles having desired properties (in terms of flocculation by the treatment liquid, temperature for forming a coating of the particles, particle size, and the like). In some embodiments, styrene acrylic resin may be used.

The resin particle content, in terms of solid content, in the non-white ink composition may be in the range of 0.1% by mass to 20% by mass relative to the total mass of the non-white ink composition and is preferably in the range of 1% by mass to 15% by mass, more preferably 3% by mass to 10% by mass.

1. 3. 2. 3. Other Constituents

The non-white ink composition may further contain a water-soluble organic solvent, a surfactant, water, a wax, a resin dispersant, a preservative/fungicide agent, a rust preventive, a chelating agent, a viscosity modifier, an antioxidant, a fungicide, and other additives in addition to the non-white coloring material and the resin particles.

The water-soluble organic solvent, the surfactant, the water and other additives that may be contained in the non-white ink composition are the same as those described for the treatment liquid, and thus description thereof is omitted. In this instance, it should be noted that "treatment liquid" or "white ink composition" is replaced with "non-white ink composition", and that "white coloring material" is replaced with "non-white coloring material".

1. 3. 2. 4. Physical Properties of Non-White Ink Composition and Application of Non-White Ink Composition onto Printing Medium In an embodiment of the invention including applying a non-white ink composition, the surface tension at 25° C. of the non-white ink composition may be 40 mN/m or less and is preferably 38 mN/m or less, 35 mN/m or less, or 30 mN/m or less from the viewpoint of appropriately spreading to wet the printing medium.

In some embodiments, the non-white ink composition may be applied onto the printing medium by an ink jet method. In this instance, the viscosity of the non-white ink composition at 20° C. is preferably in the range of 1.5 mPa·s to 15 mPa·s, more preferably 1.5 mPa·s to 5 mPa·s, or 1.5 mPa·s to 3.6 mPa·s. The ink jet method facilitates efficient formation of desired images with the non-white ink composition.

1. 4. Ink Jet Method

The printing method of an embodiment of the invention may use an ink jet printing apparatus including a printing head. Hence, one or more applications of the treatment liquid and the ink compositions may be performed by an ink jet method as needed. The ink jet printing apparatus that may be used in the printing method disclosed herein will now be described.

The ink jet printing apparatus may be a serial type or a line type. In either case, the ink jet printing apparatus includes a printing head, and the printing head ejects droplets of the treatment liquid or the ink composition with a predetermined volume or mass onto the printing surface of a printing medium at a predetermined timing while changing the relative position with respect to the printing medium, thus applying the treatment liquid or the ink composition onto the medium to form a predetermined image.

The ink jet printing apparatus used in the method disclosed herein may optionally include known components, such as a drying unit, a roll unit, and a winding device. In addition, the ink jet printing apparatus may include a transport device, an image-forming unit operable to print images with the treatment liquid and one or more ink compositions, a drying device, and a total drying device operable to heat and blow air over the printing surface.

The transport device may include, for example, a roller. A plurality of rollers, or transport devices, may be used. A desired number of transport devices are placed at desired positions, provided that the printing medium can be transported. The transport device may be provided with, for example, a paper feed roller, a paper feed tray, a paper ejection roller, a paper ejection tray, and a platen or the like.

The image-forming unit is operable to eject the treatment liquid and one or more ink compositions onto the printing surface of the printing medium to form an image layer. The image-forming unit includes a printing head having nozzles. The printing head may be provided for each of the treatment liquid and ink compositions, or nozzle lines of one printing head may be assigned, one for each of the treatment liquid and ink compositions.

The drying device may be used for drying the image layer formed on the printing surface or removing volatile components from the surface of the printing medium. A desired number of drying devices may be placed at appropriate positions in view of the timing of application and the path for transporting the printing medium. For drying the image layer, heat may be applied to the printing medium by heating the platen, or air is blown over the image layer on the printing medium. Both operations may be combined. More specifically, the image layer may be dried by, for example, forcible air heating, heat radiation, conduction heating, high-frequency drying, or microwave drying.

1. 5. Application and Other Operations and Modification Thereof

The printing method disclosed herein includes applying the treatment liquid onto a printing medium and applying at least one ink composition onto the printing medium. The operation of applying the ink composition includes applying the white ink composition onto the printing medium and, optionally, applying a non-white ink composition onto the printing medium. These operations may be performed any times in any order. The treatment liquid and the ink composition(s) may be applied onto the same region of the printing medium.

For example, when the white ink composition is applied after the application of the treatment liquid, the white ink composition may be applied onto the region of the printing medium where the treatment liquid has been applied so that the flocculant in the treatment liquid can act reliably on the white ink composition. In this instance, if the white coloring material in the white ink composition is flocculable, the flocculable white coloring material will flocculate reliably and act to enhance the color development of the resulting image. In contrast, if the white coloring material in the white ink composition is non-flocculable, the non-flocculable white ink composition does not much consume the flocculant in the treatment liquid, and the flocculant will act sufficiently on the ink composition to be applied on the coating of the white ink composition.

In this instance, when the white ink composition is applied, the treatment liquid may be in a dry state (in a state where all the liquid medium of the treatment liquid has been evaporated) or in a semi-dry state (in a state where a portion of the liquid medium remains in the treatment liquid). The flocculant acts on the white ink composition in either case. In an embodiment, the white ink composition may be applied onto the treatment liquid in a semi-dry state from the viewpoint of efficiently mixing the treatment liquid and the white ink composition. If an excessive amount of liquid medium remains in the treatment liquid in a semi-dry state, the image of the white ink composition may bleed. After the application of the treatment liquid, the amount of remaining liquid medium in the treatment liquid may be adjusted by an appropriate drying operation.

For example, in an embodiment, the white ink composition may be applied onto a heated printing medium. In other words, the printing medium may be heated when the white ink composition is applied. For example, if the above-described ink jet printing apparatus is used for applying the white ink composition, the printing medium may be heated by the platen or the like, and onto the printing medium in this state, the white ink composition is ejected from the printing head. The temperature of the printing medium at this time is not particularly limited but may be set in view of how much the treatment liquid is dry, or the glass transition temperature (Tg) of the resin of the resin particles, if contained, in the treatment liquid. If the Tg of the resin of the resin particles is taken into account, the temperature of the printing medium may be set at a temperature higher than the Tg of the resin of the resin particles by 5° C. or more, preferably 10° C. or more.

More specifically, when the white ink composition is applied, the printing medium may be heated to a temperature of 25° C. to 50° C., preferably 30° C. to 40° C. or 32° C. to 38° C. When the printing medium receiving the white ink composition has a temperature in such a range, the treatment liquid can come into an appropriate dry state, and the resin particles, if contained in the treatment liquid, can form an appropriate coating. Thus, the white ink composition can appropriately fill the region to be printed, and at least either fixability or rub fastness can be enhanced.

The treatment liquid, the white ink composition, and the non-white ink composition may be applied in this order. In this instance, the non-white ink composition may be applied onto the region of the printing medium where the treatment liquid and the white ink composition have been applied. Thus, the non-white ink composition is subjected to flocculation by the flocculant by only one operation of applying the treatment liquid onto the printing medium. Also, when the treatment liquid and/or the non-white ink composition is applied, the temperature of the printing medium may be set in a range described above. The application of the non-white ink composition onto the printing medium may be performed before or after the application of the white ink composition. In some embodiments, the non-white ink composition may be applied after the application of the white ink composition.

In an embodiment in which the white ink composition is applied after the application of the treatment liquid, when the flocculant content in the treatment liquid is low or is reduced by consumption by the white ink composition, the treatment liquid may be further applied in another step onto the region where the white ink composition has been applied. Thus, the flocculant can act reliably on the non-white ink composition.

When the treatment liquid and the white ink composition are applied onto a printing region of the printing medium, the printing region may include an area where the white ink composition is applied at a rate in the range of 5 mg/inch$^2$ to 30 mg/inch$^2$, preferably 10 mg/inch$^2$ to mg/inch$^2$, more preferably 15 mg/inch$^2$ to 22 mg/inch$^2$. Thus, a favorable white image appropriately filled with the white ink composition is formed, and the image exhibits high rub fastness. The phrase "include an area where the white ink composition is applied at a rate in the above-range" or similar expression means that the printing region has at least one area where the ink composition is applied at such a rate. In addition, in the printing region of the printing medium where the treatment liquid and the white ink composition are applied, the area where a maximum amount of the white ink composition is applied receives the white ink composition at a rate in a range mentioned above from the same viewpoint.

When the treatment liquid and the white ink composition are applied onto a printing region, the printing region may include an area where the ratio of the amount of applied treatment liquid to the amount of applied white ink composition is in the range of 5% by mass to 30% by mass, preferably 7% by mass to 20% by mass or 8% by mass to 15% by mass. Thus, bleeding is reduced, and rub fastness is enhanced. In addition, in the printing region of the printing medium where the treatment liquid and the white ink composition are applied, the area where the ratio of the amount of applied treatment liquid to the amount of applied white ink composition is maximum receives the treatment liquid and the white ink composition in a ratio in a range mentioned above from the same viewpoint.

When the non-white ink composition is further applied onto the printing region where the treatment liquid and the white ink composition are applied, the printing region may include an area where the non-white ink composition is applied at the same rate as the white ink composition from the above-mentioned viewpoint.

The printing method disclosed herein may further include heating the printing medium after the application of the treatment liquid and the application of the ink compositions (post-application heating). This heating for the printing medium may be performed, if an ink jet printing apparatus is used, with a drying device as described above. Irrespective of whether the ink jet printing apparatus is used, any appropriate drying device may be used. By drying the printing medium with a drying device, the printed image can be sufficiently fixed, and the resulting printed item can be used immediately after printing. In this instance, the temperature of the printing medium is not particularly limited but may be set in view of the glass transition temperature (Tg) of the resin of the resin particles contained in the printed item. When the Tg of the resin of the resin particles is taken into account, the temperature of the printing medium may be set at a temperature higher than the Tg of the resin of the resin particles by 5° C. or more, preferably 10° C. or more.

More specifically, by post-application heating, the printing medium may be heated to a temperature of 30° C. to 120° C., preferably 40° C. to 100° C. or 50° C. to 80° C. When the printing medium is heated to such a temperature, the resin particles in the printed item can be formed into a coating and thus form a flat surface, and the image in the printed item can be dried and sufficiently fixed.

In an embodiment, the printing method may further include additional operations, such as applying a clear ink onto the printing medium.

2. White Ink Composition

The white ink composition disclosed herein is used in the printing method described above. The white ink composition contains a white coloring material and resin particles as described above and is applied onto the printing medium in combination with a non-white ink composition containing a non-white coloring material and resin particles and a treatment liquid containing a flocculant operable to flocculate one or more constituents of the ink compositions. The volume average particle size of the resin particles varies 50% or less when mixed with the treatment liquid.

Such a white ink composition can form a white image appropriately filled therewith on the printing medium. The white ink composition may be prepared by mixing the above-described constituents in an arbitrary order and, optionally, removing impurities by, for example, filtration. For mixing the constituents, for example, the constituents may be added one after another into a container equipped with a stirring device, such as a mechanical stirrer or a magnetic stirrer, and the contents of the container are stirred. Filtration may be performed as required by, for example, centrifugal filtration or using a filter paper.

The surface tension at 20° C. of the white ink composition is preferably in the range of 15 mN/m to 50 mN/m, more preferably in the range of 20 mN/m to 40 mN/m, from the viewpoint of the balance between the quality of images and the reliability of the white ink composition as an ink jet ink. Also, from the same viewpoint, the viscosity at 20° C. of each ink composition is preferably in the range of 2 mPa·s to 15 mPa·s, more preferably in the range of 2 mPa·s to 10 mPa·s.

3. Examples and Comparative Examples

The above-described embodiments of the invention will now be further described in detail with reference to Examples. However, the invention is not limited to the Examples.

3. 1. Preparation of Pigment Dispersion Liquid and Resin Emulsion

Preparation of White Coloring Material Dispersion Liquid

To 155 parts by mass of ion-exchanged water in which 0.1 part by mass of 30% ammonia solution (neutralizer) was dissolved, 4 parts by mass of acrylic acid-acrylic ester copolymer (weight average molecular weight: 25,000, acid value: 18) was added as the resin dispersant and dissolved. Then, 40 parts by mass of titanium oxide (C. I. Pigment White 6) that was a white pigment was added into the resin dispersant solution and dispersed with zirconia beads in a ball mill for 10 hours. Subsequently, the dispersion was filtered to remove coarse particles and impurities by centrifugal separation. The white pigment content in the resulting dispersion liquid was adjusted to 20% by mass to yield a white coloring material dispersion liquid. The average particle size of the white pigment was 350 nm.

Preparation of Non-White Coloring Material Dispersion Liquid

To 160.5 parts by mass of ion-exchanged water in which 2 part by mass of 30% ammonia solution (neutralizer) was dissolved, 7.5 parts by mass of acrylic acid-acrylic ester copolymer (weight average molecular weight: 25,000, acid value: 180) was added as the resin dispersant and dissolved. Then, 30 parts by mass of C. I. Pigment Blue 15:3 that was a cyan pigment was added into the resin dispersant solution and dispersed with zirconia beads in a ball mill for 10 hours. Subsequently, the dispersion was filtered to remove coarse particles and impurities by centrifugal separation. The cyan pigment content in the resulting dispersion liquid was adjusted to 15% by mass to yield a cyan coloring material dispersion liquid. The average particle size of the cyan pigment was 100 nm.

Resin Emulsions (Emulsions of Resin Particles)

Four resin emulsions containing resin particles whose particle size varies in different degrees were prepared. The resin emulsions were resin emulsion 1 whose resin has a low acid value of 10; resin emulsion 4 whose resin has a high acid value of 150; and resin emulsions 2 and 3 whose resins have intermediate acid values of 30 and 100, respectively. Resin emulsion 1 contained a large amount of emulsifier operable to emulsify the resin particles, and the resin emulsion 4 contained a small amount of emulsifier. The emulsifier contents in the resin emulsions 2 and 3 were between the contents of resin emulsions 1 and 4 but are reduced in this order. The solid content in each emulsion was 40% by mass. The resin particles used in each emulsion had a glass transition temperature Tg of 75° C. to 80° C.

3. 2. Variation in Volume Average Particle Size of the Particles in Pigment Dispersion Liquid and Resin Emulsions The variation in volume average particle size of the particles in each of the coloring material dispersion liquids and resin emulsions when the dispersion liquid or emulsion was mixed with the treatment liquid was determined. The solid content in each of the coloring material dispersion liquids and the resin emulsions was adjusted to 10% by mass, if exceeded 10% by mass, by adding water, and each dispersion liquid or emulsion was mixed with the treatment liquid so that the mass ratio of the solid resin or solid coloring material to the solid flocculant would be 4:1. The mixture was stirred at room temperature (25° C.) for minute and then allowed to stand for 1 minute. Subsequently, the mixture was diluted with water to a solid resin content or a solid coloring material content of 0.01% by mass, and then the volume average particle size in the resulting mixture was measured by a light scattering method. The volume average particle size was D50 on a volume basis.

A variation in volume average particle size was defined as the percentage of an increase in volume average particle size of the coloring material or the resin particles in a coloring material dispersion liquid or a resin emulsion from the initial state (where the solid content in the coloring material dispersion liquid or the resin emulsion was adjusted to 0.01% by mass by adding water) with respect to the particle size in the initial state. More specifically, the variation in volume average particle size was calculated from the above-described equation. The volume average particle size in each dispersion liquid or emulsion before mixing was as follows:

Resin emulsions 1 to 4: about 190 nm each
White coloring material dispersion liquid: 300 nm
Non-white coloring material dispersion liquid: 120 nm From the variations thus determined, the flocculation degree of each composition was rated according to the following criteria. The results are shown in Table 2. Criteria:

A: 3% or less
B: more than 3% to 10%
C: more than 10% to 50%
D: more than 50%

3. 3. Preparation of Treatment Liquids, White Ink Compositions, and Non-White Ink Compositions Treatment liquids R1 to R4, white ink compositions W1 to W4, and non-white ink compositions C1 and C2, each containing different constituents were prepared by using the constituents shown in Table 1. Each composition or treatment liquid was prepared by stirring the constituents shown in Table 1 with a magnetic stirrer for 2 hours in a container, followed by filtering through a membrane filter of 5 μm in pore size to remove impurities and coarse particles. All the values in Table 1 are represented by mass % (percent by mass), and ion-exchanged water was added so that the total of the ink composition came to 100% by mass. The white coloring material dispersion liquid and the non-white coloring material dispersion liquid were prepared in advance as described above. The values in parentheses in Table 1 are each the mass (in terms of mass %) of the solids derived from the corresponding coloring material dispersion liquid in the ink composition, the mass (in terms of mass %) of the solids derived from the corresponding resin emulsion in the composition, or the mass (in terms of mass %).

TABLE 1

|  | Constituent | Treatment liquid | | | | White ink composition | | | | Non-white ink composition | |
|---|---|---|---|---|---|---|---|---|---|---|---|
|  |  | R1 | R2 | R3 | R4 | W1 | W2 | W3 | W4 | C1 | C2 |
| Coloring material | Non-white pigment dispersion liquid (Pigment content: 15 mass %, Resin dispersant content: 3.75 mass %) | — | — | — | — | — | — | — | — | 33.3 (6.25) | 33.3 (6.25) |
|  | White pigment dispersion liquid (Metal oxide content: 20 mass %, Resin dispersant content: 2 mass %) | — | — | — | — | 50 (11) | 50 (11) | 50 (11) | 50 (11) | — | — |
| Flocculant | Magnesium sulfate heptahydrate | 7 | — | — | 7 | — | — | — | — | — | — |
|  | Malonic acid | — | 7 | — | — | — | — | — | — | — | — |
|  | Polyallylamine free type (cationic resin, 20 mass % aqueous solution) | — | — | 35 (7) | — | — | — | — | — | — | — |
| Resin particles | Resub emulsion 1 (resin solids: 40 mass % dispersion liquid) | — | — | — | 10 (4) | 20 (8) | — | — | — | 20 (8) | — |
|  | Resub emulsion 2 (resin solids: 40 mass % dispersion liquid) | — | — | — | — | — | — | 20 (8) | — | — | — |
|  | Resub emulsion 3 (resin solids: 40 mass % dispersion liquid) | — | — | — | — | — | — | — | 20 (8) | — | — |
|  | Resub emulsion 4 (resin solids: 40 mass % dispersion liquid) | — | — | — | — | — | 20 (8) | — | — | — | 20 (8) |
| Wax | NOPCOTE PEM-17 (melting point: 103° C., 40 mass % dispersion liquid) | — | — | — | — | 2.5 (1) | 2.5 (1) | 2.5 (1) | 2.5 (1) | 2.5 (1) | 2.5 (1) |

TABLE 1-continued

|  | Constituent | Treatment liquid | | | | White ink composition | | | | Non-white ink composition | |
|---|---|---|---|---|---|---|---|---|---|---|---|
|  |  | R1 | R2 | R3 | R4 | W1 | W2 | W3 | W4 | C1 | C2 |
| Water-soluble solvent | Propylene glycol (boiling point: 189° C.) | 5 | 5 | 5 | 5 | 5 | 5 | 5 | 5 | 10 | 10 |
|  | 1,3-Butylene glycol (boiling point: 208° C.) | 10 | 10 | 10 | 10 | 5 | 5 | 5 | 5 | 5 | 5 |
|  | 1,2-Hexanediol (boiling point: 224° C.) | 5 | 5 | 5 | 5 | 3 | 3 | 3 | 3 | 3 | 3 |
|  | 2-Pyrrolidone (boiling point: 245° C.) | 15 | 15 | 10 | 10 | 10 | 10 | 10 | 10 | 10 | 10 |
| Additive | BYK-348 | 0.5 | 0.5 | 0.5 | 0.5 | 0.5 | 0.5 | 0.5 | 0.5 | 0.5 | 0.5 |
|  | Triisopropanolamine | 0.1 | 0.1 | 0.1 | 0.1 | 3 | 3 | 3 | 3 | 3 | 3 |
| Water | Ion-exchange water | Balance | Balance | Balance | Balance | Balance | Balance | Balance | Balance | Balance | Balance |
|  | Total | 100 | 100 | 100 | 100 | 100 | 100 | 100 | 100 | 100 | 100 |

The constituents in Table 1 other than resin emulsions and constituents represented by compound names are as follows:

Polyallylamine resin free type (cationic resin, 20 mass % aqueous solution): PAA-05 produced by Nittobo Medical NOPCOTE PEM-17 (polyethylene wax emulsion, 40% dispersion liquid, produced by San Nopco, melting point: 103° C.)

BYK-348 (silicone surfactant, produced by BYK)

3. 3. Preparation of Printed Items

Printed items to be subjected to examination were prepared as described below. An ink jet printer SC-540650 (manufactured by Seiko Epson) was modified as described below. Three printing heads were disposed along the direction in which the printing medium (Scotchcal Graphic Film IJ8150, polyvinyl chloride transparent film manufactured by 3M) is transported. The three heads were filled with a treatment liquid, a white ink composition, and a non-white ink composition in this order from the upstream side. A test pattern was printed on the printing medium by applying the treatment liquid, the white ink composition, and the non-white ink composition in this order so as to superimpose each other. The application rate of each of the treatment liquid and the ink compositions was adjusted to the value shown in Table 2 at a basic resolution of 1440 dpi×1400 dpi.

The common platen opposed to the three printing heads was provided with a platen heater. The secondary heating was performed with a secondary dryer (by infrared irradiation) disposed downstream from the printing heads. For the heating during application and the secondary heating (post-application heating for drying), the surface temperature of the printing medium was controlled to the temperature shown in Table 2. In each heating, air was blown onto the printing medium with a fan. The blowing air temperature was measured at a position not affected by the temperature of the printing medium, and the blowing air speed was measured at the vicinity of the printing medium. The blowing temperature and the blowing air speed in each step were measured and the results are shown in Table 2. The surface temperature of the printing medium was the highest temperature in each step.

The treatment liquids, the white ink compositions and the non-white ink compositions shown in Table 1 were used in combinations as shown in Table 2, and thus printed items were prepared. The mark "-" in some cells in the non-white ink composition row represents that no non-white ink composition was applied.

TABLE 2

|  |  |  |  | Example | | | | | | | | |
|---|---|---|---|---|---|---|---|---|---|---|---|---|
|  |  |  |  | 1 | 2 | 3 | 4 | 5 | 6 | 7 | 8 | 9 |
| Treatment liquid (Application rate: 4 mg/inch²) | | | | R1 | R2 | R3 | R4 | R1 | R2 | R3 | R4 | R1 |
| White ink (Application rate: 20 mg/inch²) | | | | W1 | W1 | W1 | W1 | W1 | W1 | W1 | W1 | W1 |
| Non-white ink (Application rate: 20 mg/inch²) | | | | — | — | — | — | C1 | C1 | C1 | C1 | C2 |
| Application | Blowing | Air speed (m/sec) | | 2 | 2 | 2 | 2 | 2 | 2 | 2 | 2 | 2 |
|  |  | Air temperature (° C.) | | 30 | 30 | 30 | 30 | 30 | 30 | 30 | 30 | 30 |
|  | Heat transfer | Hot plate heating (Paper surface temperature/° C.) | | 35 | 35 | 35 | 35 | 35 | 35 | 35 | 35 | 35 |
| Drying | Blowing | Air speed over paper surface (m/s) | | 3 | 3 | 3 | 3 | 3 | 3 | 3 | 3 | 3 |
|  |  | Air temperature (° C.) | | 50 | 50 | 50 | 50 | 50 | 50 | 50 | 50 | 50 |
|  | Irradiation | IR irradiation (Paper surface temperature/° C.) | | 80 | 80 | 80 | 80 | 80 | 80 | 80 | 80 | 80 |
| Flocculation of resin particles in white ink | | | | A | A | A | A | A | A | A | A | A |
| Flocculation of coloring material in white ink | | | | A | A | A | A | A | A | A | A | A |
| Flocculation of resin particles in non-white ink | | | | — | — | — | — | A | A | A | A | D |
| Flocculation of coloring material in non-white ink | | | | — | — | — | — | D | D | D | D | D |
| Evaluation result | Filling | | | A | A | A | A | B | B | A | A | A |
|  | Bleeding | | | A | A | A | A | A | B | B | B | A |
|  | Rub fastness | | | A | A | B | A | A | B | A | A | A |
|  | Anti-blocking | | | A | A | A | A | B | A | B | A | B |
|  | Lamination resistance | | | A | A | B | A | A | B | B | B | B |

TABLE 2-continued

|  |  |  | Example | | | | | | Comparative Example | | |
|---|---|---|---|---|---|---|---|---|---|---|---|
|  |  |  | 10 | 11 | 12 | 13 | 14 | 15 | 1 | 2 | 3 |
| Treatment liquid (Application rate: 4 mg/inch²) | | | R2 | R3 | R4 | R1 | R1 | R1 | R1 | R1 | R1 |
| White ink (Application rate: 20 mg/inch²) | | | W1 | W1 | W1 | W3 | W4 | W1 | W2 | W2 | W2 |
| Non-white ink (Application rate: 20 mg/inch²) | | | C2 | C2 | C2 | — | — | — | — | C1 | C2 |
| Application | Blowing | Air speed (m/sec) | 2 | 2 | 2 | 2 | 2 | 2 | 2 | 2 | 2 |
|  |  | Air temperature (° C.) | 30 | 30 | 30 | 30 | 30 | 30 | 30 | 30 | 30 |
|  | Heat transfer | Hot plate heating (Paper surface temperature/° C.) | 35 | 35 | 35 | 35 | 35 | 30 | 35 | 35 | 35 |
| Drying | Blowing | Air speed over paper surface (m/s) | 3 | 3 | 3 | 3 | 3 | 3 | 3 | 3 | 3 |
|  |  | Air temperature (° C.) | 50 | 50 | 50 | 50 | 50 | 50 | 50 | 50 | 50 |
|  | Irradiation | IR irradiation (Paper surface temperature/° C.) | 80 | 80 | 80 | 80 | 80 | 80 | 80 | 80 | 80 |
| Flocculation of resin particles in white ink | | | A | A | A | B | C | A | D | D | D |
| Flocculation of coloring material in white ink | | | A | A | A | A | A | A | A | A | A |
| Flocculation of resin particles in non-white ink | | | D | D | D | — | — | — | — | A | D |
| Flocculation of coloring material in non-white ink | | | D | D | D | — | — | — | — | D | D |
| Evaluation result | | Filling | A | A | A | B | B | A | C | C | D |
|  |  | Bleeding | A | A | A | A | B | B | A | D | C |
|  |  | Rub fastness | A | B | A | A | B | A | D | D | D |
|  |  | Anti-blocking | B | A | B | A | B | A | C | D | C |
|  |  | Lamination resistance | B | B | B | A | A | A | C | D | D |

3. 4. Evaluation 3. 4. 1. Degree of Filling (Degree of Filling in Solid Pattern)

In Examples where no non-white ink composition was applied, the printing was performed up to the application of the white ink composition. In Examples where any of the non-white ink compositions was applied, printing was performed up to the application of the non-white ink composition. Test patterns printed by superimposing the treatment liquid and the ink composition(s) on top of one another at the respective application rates shown in Table 2 were visually examined. Each test pattern measured 3 cm×3 cm. The image quality of each test pattern in terms of the degree of filling in the solid pattern was rated visually and through a loupe according to the following criteria. The results were shown in Table 2. Ratings A and B represent acceptable levels.

A: When observed visually and through a loupe, the test pattern was filled with the ink composition forming the uppermost coating layer without exposing any portion of the underlying layer, and the ink composition of the uppermost layer did not have a nonuniformity in density.

B: When observed through a loupe, the test pattern was not sufficiently filled with the ink composition forming the uppermost coating layer and the underlying layer was slightly exposed, but such a state was not visually observed.

C: When visually observed, the test pattern was not sufficiently filled with the ink composition forming the uppermost coating layer and the underlying layer was partially exposed.

D: When visually observed, the test pattern was not sufficiently filled with the ink composition forming the uppermost coating layer and some exposed portions of the underlying layer were clearly seen.

3. 4. 2. Bleeding

In Examples where no non-white ink composition was applied over the pattern formed applying the treatment liquid at a rate shown in Table 2, a ruled line of the white ink composition was drawn in the scanning direction of the head. In Examples where any of the non-white ink compositions was applied, a ruled line of the non-white ink composition was drawn in the scanning direction on the test pattern of the white ink composition formed by superimposing the white ink composition at a rate shown in Table 2. Two ruled lines each having a width of 0.2 mm were drawn with a distance of 0.2 mm therebetween. The ruled lines were visually observed for evaluation according to the following criteria. The results were shown in Table 2.

A: Ruled lines had a constant width with no contact with each other.

B: The width of the ruled lines was not always constant but with no contact with each other.

C: The width of the ruled lines was not constant, and a contact was observed between the two lines.

D: The width of the ruled lines was so inconstant that the lines hardly have a space therebetween.

3. 4. 3. Rub Fastness

In Examples where no non-white ink composition was applied, the printing of a pattern was performed up to the application of the white ink composition. In Examples where any of the non-white ink compositions was applied, printing of a pattern was performed up to the application of the non-white ink composition. Each pattern printed in the Examples was rubbed, reciprocally 20 times or until the printed item was peeled, with a rubber of a Gakushin-type rubbing tester AB-301 (manufacture by TESTER SANGYO) provided with a white cotton cloth (according to JIS L 0803) at a load of 200 g. The degree of peeling of the printed pattern form the printing medium was visually observed, and rub fastness was evaluated according to the following criteria. The results were shown in Table 2.

A: No scratch was observed in the printed pattern, and no stain of the ink composition in the white cotton cloth was not observed.

B: slight scratches in the printed pattern or a slight stain of the ink composition in the white cotton cloth was observed.

C: Scratches in the printed pattern and a stain of the ink composition in the white cotton cloth were observed.

D: The printed pattern was peeled, and a marked stain of the ink composition in the white cotton cloth was observed.

3. 4. 4. Anti-Blocking Property

In Examples where no non-white ink composition was applied, the printing of a pattern was performed up to the application of the white ink composition. In Examples where any of the non-white ink compositions was applied, printing of a pattern was performed up to the application of the non-white ink composition. For each printed item produced in the Examples, the rear side of the printing medium was put on the printed surface of the printed item, and the printed item and the printing medium in such a state were allowed to stand in an environment of 20° C. to 25° C. in temperature and 40% RH to 60% RH in humidity for 24 hours while a load of 500 g/cm$^2$ was applied. After standing, the printed item was checked for peeling of the printed pattern from the printed item and a transfer to the rear side, and the durability in terms of anti-blocking was evaluated according to the following criteria. The results were shown in Table 2.

A: No peeling of the printed pattern was not observed, and the printed pattern was not transferred in spite of putting printed items on top of each other.

B: No peeling of the printed pattern was not observed, but the printed pattern was slightly transferred when printed items were put on top of each other.

C: A peeling of the printed pattern was observed, and the printed pattern was transferred when printed items were put on top of each other.

D: A large peeling of the printed pattern was observed, and the printed pattern was transferred when printed items were put on top of each other.

3. 4. 5. Lamination Resistance

In Examples where no non-white ink composition was applied, the printing of a pattern was performed up to the application of the white ink composition. In Examples where any of the non-white ink compositions was applied, printing of a pattern was performed up to the application of the non-white ink composition. The printed surface of each printed item of the Examples was laminated with a lamination film GIL-1148 (manufactured by Lintec Corporation). Then, the durability in terms of lamination resistance was evaluated according to the following criteria. The results were shown in Table 2.

A: Bleeding was not observed in the printed pattern, and a local separation of the lamination film was not observed.

B: A slight degree of bleeding was observed in the printed pattern, but a local separation of the lamination film was not observed.

C: Bleeding was observed in the printed pattern, and a local separation of the lamination film was also observed.

D: A significant degree of bleeding and a large local separation were observed.

3. 5. Evaluation Results

The results of the above examinations suggest the following. In the Examples where the white ink composition containing resin particles whose volume average particle size varies 50% or less was used in combination with the treatment liquid, the printed image was satisfactorily filled with the ink composition. In contrast, in the Comparative Examples, the degree of filling was insufficient. This will be described in detail.

The printed items produced in the Examples where the printed pattern was formed by using a white ink composition containing any of resin emulsions 1 to 3 each containing less flocculable resin particles (resin particles whose volume average particle size varies 50% or less when the emulsion is mixed with the treatment liquid) were good in terms of degree of filling and anti-bleeding. This is because the white ink composition in such Examples contains a relatively large amount of solids and accordingly tends to be thickened by drying, thus being unlikely to cause bleeding even though the resin particles are less flocculable. Also, since the white ink composition is often used for printing solid patterns and is also used for forming an underlying base image that will be covered with a non-white image, the image quality of white images formed with the white ink composition is not so important. In addition, the printed items produced in such Examples were good in terms of rub fastness, anti-blocking, and lamination resistance. This is probably because the resin particles in the white ink composition are not easily flocculated by the treatment liquid. Thus, the use of such resin particles allows the formation of a uniform, smooth ink layer that can have good adhesion with the printing medium and a lamination film.

In comparison between Examples 5 and 8, the printed item produced in the Example where a treatment liquid containing a less flocculable resin emulsion was used was good in terms of anti-blocking and degree of filling.

In Examples 1 to 3, 5 to 7, and 9 to 11, any of the metal salt, the organic acid, and the cationic resin produced good results as the flocculant in the treatment liquid.

In comparison among Examples 1 to 12 in terms of 2-pyrrolidone content, the larger the 2-pyrrolidone content, the higher the rub fastness of the image.

In Examples 5 to 12, when the non-white ink composition contained resin particles that can be easily flocculated by the treatment liquid, the resulting printed items were better in terms of degree of filling and anti-bleeding. In contrast, when the non-white ink composition contained resin particles unlikely to be flocculated by the treatment liquid, the resulting printed items were better in terms of anti-blocking and lamination resistance.

In comparison among Examples 1, 13, and 14, when the white ink composition contained resin particles less likely to be flocculated by the treatment liquid, the printed items were good in terms of degree of filling, anti-bleeding, rub fastness, and anti-blocking.

In comparison between Examples 1 and 15, when the white ink composition was applied onto the printing medium whose surface temperature was higher, the resulting printed item was better in anti-bleeding. The white ink composition containing resin particles less likely to be flocculated by the treatment liquid can sufficiently fill the area to be printed, and such a white ink composition is easy to dry and thicken, thus ensuring good anti-bleeding. Therefore, it is probably beneficial to apply the white ink composition onto a printing medium having a higher surface temperature. However, if the surface temperature of the printing medium is excessively high when an ink is applied, the coating layer of the ink is dried and solidified before the ink spreads sufficiently over the area to be printed, and the ink may be dried in the ink jet head. The surface temperature of the printing medium should be controlled in an appropriate range.

On the other hand, the printed patterns formed in the Comparative Examples by using a white ink composition containing resin emulsion 4 containing flocculable resin particles (resin particles whose volume average particle size varies more than 50% when the emulsion is mixed with the treatment liquid) were not sufficiently filled with the ink composition. In addition, the printed patterns were inferior in terms of rub fastness, anti-blacking, and lamination resistance. Comparative Examples 2 and 3 were further inferior in terms of anti-bleeding. The white ink composition is often used for forming an underlying solid pattern. If the resin particles in such a white ink composition is flocculable, the coating of the white ink composition is likely to have a rough surface. Consequently, the adhesion of the coating to the printing medium reduced, and the durability of the printed item is reduced. Also, the flocculant in the treatment liquid reacts with the resin particles in the white ink composition and is thus consumed. Consequently, the treatment liquid does not react sufficiently with the constituents of the non-white ink composition. These are probably the reasons of the problems in the Comparative Examples.

Furthermore, a flocculable white coloring material dispersion liquid, not shown in the Tables, was prepared by using, in combination, the resin dispersant used in the non-white coloring material dispersion liquid, and a printed item was produced in the same manner as in Example 1 except for using this white ink composition. The results were the same as those in Example 1. The results described above suggest that use of less flocculable resin particles in the ink composition allows the resin particles to exhibit the nature of the resin particles more effectively than the case of using flocculable resin particles.

The invention is not limited to the above-described embodiments, and various modifications may be made. For example, the invention includes substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The entire disclosure of Japanese Patent Application No. 2018-034470, filed Feb. 28, 2018 is expressly incorporated by reference herein.

What is claimed is:

1. A printing method comprising:
   applying a treatment liquid onto a printing medium, the treatment liquid containing a flocculant operable to flocculate at least one constituent of an ink composition; and
   applying at least one ink composition including a white ink composition onto the printing medium, the white ink composition containing a white coloring material and resin particles,
   wherein a volume average particle size of the resin particles in the white ink composition changes 50% or less when the resin particles are mixed with the treatment liquid in comparison to the volume average particle size of the resin particles before the resin particles are mixed with the treatment liquid;
   wherein the volume average particle size of the white coloring material in the white ink composition changes 10% or less when the white coloring material is mixed with the treatment liquid in comparison to the volume average particle size of the white coloring material before the white coloring material is mixed with the treatment liquid;
   wherein the applying of the at least one ink composition further includes applying a non-white ink composition containing non-white coloring material and resin particles onto the printing medium;
   wherein a volume average particle size of the non-white coloring material in the non-white ink composition changes more than 50% when the non-white ink coloring material is mixed with the treatment liquid in comparison to the volume average particle size of the non-white coloring material before the non-white ink coloring material is mixed with the treatment liquid; and
   wherein the white ink composition and the non-white ink composition are applied onto the printing medium so as to be superimposed on each other.

2. The printing method according to claim 1, wherein the non-white ink composition is applied onto a region of the printing medium in which the treatment liquid and the white ink composition have been applied.

3. The printing method according to claim 1, wherein a volume average particle size of the resin particles in the non-white ink composition changes more than 50% when the non-white ink composition is mixed with the treatment liquid in comparison to the volume average particle size of the resin particles before the non-white ink composition is mixed with the treatment liquid.

4. The printing method according to claim 1, wherein the white ink composition has a content of polyol having a normal boiling point of more than 280° C., the content of the polyol being 3.0% by mass or less relative to the total mass of the white ink composition.

5. The printing method according to claim 1, wherein the white ink composition contains a solvent containing nitrogen.

6. The printing method according to claim 1, wherein the white ink composition is applied onto the printing medium by being ejected from an ink jet head.

7. The printing method according to claim 1, wherein the flocculant in the treatment liquid contains at least one selected from the group consisting of cationic resins, organic acids, and polyvalent metal salts.

8. The printing method according to claim 1, wherein the printing medium is heated when the white ink composition is applied thereto.

9. The printing method according to claim 1, further comprising heating the printing medium after the applying of the treatment liquid and the applying of the at least one ink composition.

10. The printing method according to claim 1, wherein the printing medium is transparent and colorless, colored and transparent, colored and opaque, or colorless and opaque.

* * * * *